United States Patent
Wang et al.

(10) Patent No.: US 12,110,448 B2
(45) Date of Patent: Oct. 8, 2024

(54) MULTIFUNCTIONAL FLUORESCENT TAGS FOR SUBTERRANEAN APPLICATIONS

(71) Applicant: Saudi Arabian Oil Company, Dhahran (SA)

(72) Inventors: Wei Wang, Quincy, MA (US);
Hooisweng Ow, Woburn, MA (US);
Sehoon Chang, Boston, MA (US)

(73) Assignee: Saudi Arabian Oil Company, Dhahran (SA)

( * ) Notice: Subject to any disclaimer, the term of this patent is extended or adjusted under 35 U.S.C. 154(b) by 277 days.

(21) Appl. No.: 17/522,437

(22) Filed: Nov. 9, 2021

(65) Prior Publication Data

US 2023/0141596 A1     May 11, 2023

(51) Int. Cl.
| | |
|---|---|
| C09K 8/24 | (2006.01) |
| C09K 8/16 | (2006.01) |
| C09K 11/02 | (2006.01) |
| C09K 11/06 | (2006.01) |
| C09K 11/68 | (2006.01) |
| C09K 11/77 | (2006.01) |
| E21B 49/00 | (2006.01) |
| E21B 49/02 | (2006.01) |

(52) U.S. Cl.
CPC .................. C09K 8/24 (2013.01); C09K 8/16 (2013.01); C09K 11/025 (2013.01); C09K 11/06 (2013.01); C09K 11/684 (2013.01); C09K 11/7773 (2013.01); E21B 49/005 (2013.01); E21B 49/02 (2013.01); C09K 2208/10 (2013.01); C09K 2211/182 (2013.01)

(58) Field of Classification Search
None
See application file for complete search history.

(56) References Cited

U.S. PATENT DOCUMENTS

| | | | |
|---|---|---|---|
| 4,772,563 | A | 9/1988 | Evangelista et al. |
| 5,124,268 | A | 6/1992 | Dakubu |
| 5,168,927 | A | 12/1992 | Stegenneier |

(Continued)

FOREIGN PATENT DOCUMENTS

| | | |
|---|---|---|
| EP | 0171978 | 11/1990 |
| EP | 1721603 | 11/2006 |

(Continued)

OTHER PUBLICATIONS

U.S. Appl. No. 17/454,176, Wang et al, filed Nov. 9, 2021.

(Continued)

*Primary Examiner* — Jeffrey D Washville
(74) *Attorney, Agent, or Firm* — Fish & Richardson P.C.

(57) ABSTRACT

Compositions and methods for determining the origin location of a subterranean rock sample. Compositions include a nanoparticle tag with a fluorescent core and a polymer shell. The fluorescent core can include up-converting nanoparticles, rare earth element doped oxide, long persistent fluorescent materials, or encapsulated lanthanide complexes. Methods include mixing a nanoparticle tag into a fluid, flowing the fluid through a work string into a subterranean formation, recovering subterranean rock samples from the subterranean formation, and determining an origin location of the subterranean rock sample by detecting the presence of the nanoparticle tag on the sample.

31 Claims, 14 Drawing Sheets

(56) References Cited

U.S. PATENT DOCUMENTS

| | | |
|---|---|---|
| 6,250,848 B1 | 6/2001 | Moridis et al. |
| 6,590,647 B2 | 7/2003 | Stephenson |
| 6,691,780 B2 | 2/2004 | Nguyen et al. |
| 7,032,662 B2 | 4/2006 | Malone |
| 7,485,471 B1 | 2/2009 | Sun et al. |
| 7,588,827 B2 | 9/2009 | Nie et al. |
| 7,879,625 B1 | 2/2011 | Boss |
| 8,269,501 B2 | 9/2012 | Schmidt et al. |
| 8,337,783 B2 | 12/2012 | Locascio et al. |
| 8,627,902 B2 | 1/2014 | Hammer |
| 8,638,104 B2 | 1/2014 | Barber et al. |
| 8,877,954 B2 | 11/2014 | Giesenberg et al. |
| 9,080,097 B2 | 7/2015 | Gupta et al. |
| 9,133,709 B2 | 9/2015 | Huh et al. |
| 9,366,099 B2 | 6/2016 | Ly |
| 10,273,399 B2 | 4/2019 | Cox |
| 10,308,865 B2 | 6/2019 | Cox |
| 10,308,895 B2 | 6/2019 | Vidal et al. |
| 10,487,259 B2 | 11/2019 | Cox |
| 2003/0220204 A1 | 11/2003 | Baran et al. |
| 2004/0108110 A1 | 6/2004 | Zupanick et al. |
| 2005/0252286 A1 | 11/2005 | Ibrahim et al. |
| 2006/0105052 A1 | 5/2006 | Acar et al. |
| 2006/0293430 A1 | 12/2006 | Wang et al. |
| 2007/0114030 A1 | 5/2007 | Todd et al. |
| 2008/0110253 A1 | 5/2008 | Stephenson et al. |
| 2008/0111064 A1 | 5/2008 | Andrews et al. |
| 2009/0087911 A1 | 4/2009 | Rogerio |
| 2009/0087912 A1 | 4/2009 | Ramos et al. |
| 2009/0248309 A1 | 10/2009 | Nelville et al. |
| 2009/0277625 A1 | 11/2009 | Bai et al. |
| 2010/0049625 A1 | 2/2010 | Biebesheimer et al. |
| 2010/0092865 A1 | 4/2010 | Kanno et al. |
| 2010/0224823 A1 | 9/2010 | Yin et al. |
| 2010/0307745 A1 | 12/2010 | Lafitte et al. |
| 2011/0012331 A1 | 1/2011 | Kim |
| 2011/0030949 A1 | 2/2011 | Weaver et al. |
| 2011/0207231 A1 | 8/2011 | Natan et al. |
| 2011/0239754 A1 | 10/2011 | Dyer et al. |
| 2011/0257887 A1 | 10/2011 | Cooper et al. |
| 2011/0260051 A1 | 10/2011 | Preudhomme et al. |
| 2011/0275061 A1 | 11/2011 | Weidemaier et al. |
| 2012/0062886 A1 | 3/2012 | Piotti et al. |
| 2012/0115128 A1 | 5/2012 | Miller |
| 2012/0135080 A1 | 5/2012 | Bromberg et al. |
| 2012/0193578 A1 | 8/2012 | Pan et al. |
| 2012/0257199 A1 | 10/2012 | Liu et al. |
| 2012/0261617 A1 | 10/2012 | Pan et al. |
| 2012/0325465 A1 | 12/2012 | Hammer et al. |
| 2013/0040292 A1 | 2/2013 | Lopez et al. |
| 2013/0078469 A1* | 3/2013 | Winter .............. B22F 1/056 252/301.16 |
| 2013/0084643 A1 | 4/2013 | Commarieu et al. |
| 2013/0087329 A1 | 4/2013 | Hewitt et al. |
| 2013/0109261 A1 | 5/2013 | Koene |
| 2013/0244914 A1 | 9/2013 | Wu et al. |
| 2013/0259808 A1 | 10/2013 | Chen et al. |
| 2013/0296453 A1 | 11/2013 | Giesenberg et al. |
| 2013/0312970 A1 | 11/2013 | Lafitte et al. |
| 2013/0341030 A1 | 12/2013 | Brannon et al. |
| 2014/0060832 A1 | 3/2014 | Mahoney et al. |
| 2014/0077121 A1 | 3/2014 | Sun et al. |
| 2014/0120627 A1 | 5/2014 | Rubino et al. |
| 2014/0186939 A1 | 7/2014 | Peterman et al. |
| 2014/0190700 A1 | 7/2014 | Tang et al. |
| 2014/0231077 A1 | 8/2014 | Rivero et al. |
| 2014/0260694 A1 | 9/2014 | Szlendak |
| 2014/0323363 A1 | 10/2014 | Perriat |
| 2014/0360973 A1 | 12/2014 | Yin et al. |
| 2015/0013983 A1 | 1/2015 | Alwattari |
| 2015/0038347 A1 | 2/2015 | Johnson et al. |
| 2015/0050741 A1 | 2/2015 | Tour et al. |
| 2015/0079270 A1 | 3/2015 | Wang et al. |
| 2015/0118501 A1 | 4/2015 | Lu |
| 2015/0132543 A1 | 5/2015 | Nouzille et al. |
| 2015/0159079 A1 | 6/2015 | Huh et al. |
| 2015/0232747 A1 | 8/2015 | Kanj et al. |
| 2015/0268370 A1 | 9/2015 | Johnston et al. |
| 2015/0368547 A1 | 12/2015 | Lesko et al. |
| 2015/0376493 A1 | 12/2015 | Huh et al. |
| 2016/0003040 A1 | 1/2016 | Jessheim et al. |
| 2016/0040514 A1 | 2/2016 | Rahmani et al. |
| 2016/0083641 A1 | 3/2016 | Gamage |
| 2016/0097750 A1 | 4/2016 | Van Herzen et al. |
| 2016/0186044 A1* | 6/2016 | Rothrock .............. C09K 8/70 507/236 |
| 2016/0215030 A1 | 7/2016 | Bressner |
| 2016/0264846 A1 | 9/2016 | Bennetzen et al. |
| 2016/0304934 A1 | 10/2016 | Matsuno |
| 2017/0022804 A1 | 1/2017 | Gupta et al. |
| 2017/0059668 A1 | 3/2017 | Chang et al. |
| 2017/0199124 A1 | 7/2017 | Bolduc et al. |
| 2017/0350236 A1 | 12/2017 | Shen et al. |
| 2018/0171782 A1 | 6/2018 | Cox et al. |
| 2018/0265635 A1 | 9/2018 | Khamatnurova et al. |
| 2018/0275114 A1 | 9/2018 | Kosynkin et al. |
| 2019/0118265 A1 | 4/2019 | Nie et al. |
| 2019/0218907 A1 | 7/2019 | Ow et al. |
| 2019/0226326 A1 | 7/2019 | Ow et al. |
| 2019/0368336 A1 | 12/2019 | Hammond et al. |
| 2019/0382648 A1* | 12/2019 | Murugesan .............. C09K 8/70 |
| 2021/0025858 A1 | 1/2021 | Ow et al. |
| 2022/0305472 A1 | 9/2022 | Baker et al. |
| 2023/0417712 A1 | 12/2023 | Wang et al. |

FOREIGN PATENT DOCUMENTS

| | | |
|---|---|---|
| EP | 2040075 | 3/2009 |
| EP | 2480625 | 4/2013 |
| EP | 2480626 | 4/2013 |
| GB | 2489714 | 10/2012 |
| JP | 2005524849 | 8/2005 |
| JP | 2007514169 | 5/2007 |
| JP | 2008505259 | 2/2008 |
| JP | 2008524602 | 7/2008 |
| JP | 2009535060 | 10/2009 |
| JP | 2009540326 | 11/2009 |
| JP | 2015523073 | 8/2015 |
| WO | WO 2010138914 | 12/2010 |
| WO | WO 2011035292 | 3/2011 |
| WO | WO 2011035294 | 3/2011 |
| WO | WO 2011063023 | 5/2011 |
| WO | WO 2012154332 | 11/2012 |
| WO | WO 2012158478 | 11/2012 |
| WO | WO 2013142869 | 9/2013 |
| WO | WO 2014014919 | 1/2014 |
| WO | WO 2014066793 | 5/2014 |
| WO | WO 2014207075 | 12/2014 |
| WO | WO 2015044446 | 4/2015 |
| WO | WO 2015058206 | 4/2015 |
| WO | WO 2015097116 | 7/2015 |
| WO | WO 2015200060 | 12/2015 |
| WO | WO 2016015027 | 1/2016 |
| WO | WO 2016087397 | 6/2016 |
| WO | WO 2017011328 | 1/2017 |
| WO | WO 2017136641 | 8/2017 |
| WO | WO 2017164822 | 9/2017 |
| WO | WO 2018085504 | 5/2018 |
| WO | WO 2018175763 | 9/2018 |

OTHER PUBLICATIONS

U.S. Appl. No. 17/454,181, Wang et al., filed Nov. 9, 2021.
U.S. Appl. No. 17/522,445, Wang et al., filed Nov. 9, 2021.
Agenet et al., "SPE 157019: Fluorescent Nanobeads: a First Step Toward Intelligent Water Tracers" Society of Petroleum Engineers, SPE International Oilfield Nanotechnology conference, Jun. 12-14, 2012, 13 pages.
Anisimov, "SPE 118862: The Use of Tracers for Reservoir Characterization" Society of petroleum Engineers (SPE), presented at SPE Middle East Oil and Gas Show and Conference, Mar. 15-18, 2009, 8 pages.

(56) References Cited

OTHER PUBLICATIONS

Armelao et al., "Design of luminescent lanthanide complexes: From molecules to highly efficient photo-emitting materials" Coordination Chemistry Reviews, vol. 254, 5-6, Mar. 2010, 19 pages.
Aslan et al., "Fluorescent Core—Shell AG@$SiO_2$ Nanocomposites for Metal-Enhanced Fluorescence and Single Nanoparticle Sensing Platforms" Jan. 19, 2007, 2 pages.
Badgett et al., "Totalsynthese eines Neobetanidin-Derivates und des Neobetenamins" Helvetica Chimica Acta, 1970, 53(2): 433-448, 16 pages (English Abstract).
Bagaria et al., "Iron Oxide Nanoparticles Grafted with Sulfonated Copolymers are Stable in Concentrated Brine at Elevated Temperatures and Weakly Adsorb on Silica" ACS Applied Materials & Interfaces, vol. 5, No. 8, Mar. 25, 2013, 3329-3339, 11 pages.
Bala et al., "Interaction of Different Metal Ions with Carboxylic Acid Group: A Quantitative Study" The Journal of Physical Chemistry A, vol. 111, No. 28, Jun. 2007, 6183-6190, 8 pages.
Bao et al., "Luminescence properties of the co-luminescence groups of Sm-La-pyridyl carboxylic acids" Journal of Rare Earths, 30(4), Apr. 2012, 320-324, 5 pages.
Blachier et al., "Adsorption of polyamine on clay minerals" Journal of Colloid and Interface Science, 336, Aug. 2009, 599-606, 8 pages.
Borrini et al., "Water Soluble PDCA Derivatives for Selective Ln(III)/An(III) and Am(III)/Cm(III) Separation" Solvent Extraction and Ion Exchange, 33(3), Oct. 2014, 224-235, 30 pages.
Brichart et al., "The Use of Fluorescent Tracers for Inhibitor Concentration Monitoring Useful for Scale Inhibitor" International Petroleum Technology Conference, IPTC-17933-MS, presented at the International Petroleum Technology Conference held in Kuala Lumpur, Malaysia, Dec. 10-12, 2014, 8 pages.
Bunzil et al., "Taking advantage of luminescent lanthanide ions" Chemical Society Reviews, Dec. 2005, 29 pages.
Chang et al., "Magnetic SERS Composite Nanoparticles for Microfluidic Detection" 251st ACE National Meeting, Mar. 13-17, 2016, 1 page.
Chen et al., "Aggregation Kinetics of Alginate-Coated Hematite Nanoparticles in Monovalent and Divalent Electrolytes" Environmental Science & Technology, vol. 40, No. 5, Mar. 2006, 1516-1523, 9 pages.
Chen et al., "Analysis of the solution conformations of T4 lysozyme by paramagnetic NMR spectroscopy" Physical Chemistry Chemical Physics, 2016, 18(8), 5850-5859, 10 pages.
Chen et al., "Impact of Irreversible Retention on Tracer Deployments; Constraining Novel Material Deployments" SPE 188890-MS, in SPE Abu Dhabi International Petroleum Exhibition and Conference, Society of Petroleum Engineers, Nov. 2017, 8 pages.
Chen et al., "Improved Reservoir History Matching and Prudction Optimization with Tracer Data" SPE 191523-MS, in SPE Annual Technical Conference and Exhibition, Society of Petroleum Engineers, Sep. 2018, 15 pages.
Chen et al., "Upconversion Nanoparticles: Design, Nanochemistry, and Applications in Theranostics" Chem. Rev, 114(10), Mar. 2014, 5161-5214, 54 pages.
Chen et al., "FITC functionalized magnetic core-shell $Fe_3O_4$/Ag hybrid nanoparticle for selective determination of molecular biothiols" Elsevier Ltd., Dec. 2013, 7 pages.
Chen et al.; "Hydration Repulsion between Carbohydrate Surfaces Mediated by Temperature and Specific Ions" Scientific Reports, vol. 6, Jun. 23, 2016, 10 pages.
Cheraghian, "Application of nano-particles of clay to improve drilling fluid" Int. J. Nanosci. Nanotechnol., 13, Jun. 2017, 177-186, 10 pages.
Chuang et al., "Ultra-sensitive in-situ detection of novel near-infrared persistent luminescent tracer nanoagents in crude oil-water mixtures" a natureresearch journal, Scientific Reports, Jun. 15, 2016, 5 pages.
Coates et al., "Enhancement of luminescence of europium(m) ions in water by use of synergistic chelation. Part 1.1 : 1 and 2 : 1 complexes" J. Chem. Soc, Perkin Trans., Jan. 1996, 1275-1282, 8 pages.

Cole et al.; "Polyethylene Glycol Modified, Cross-Linked Starch-Coated Iron Oxide Nanoparticles for Enhanced Magnetic tumor Targeting" Biomaterials, vol. 32, No. 8, Mar. 1, 2011, 2183-2193, 11 pages.
Cox et al., "Pyrolyzable Nanoparticle Tracers for Environmental Interrogation and Monitoring" ACS Appl. Mater. Interfaces, 2017, 9(15), 13111-13120, 10 pages.
Cubillos et al., "SPE 174394-MS: The Value of Inter-well and Single Well Tracer Technology for De-Risking and Optimizing a CEOR Process—Caracara Field Case" Society of Petroleum Engineers (SPE), presented at EUROPEC 2015, Jun. 1-4, 2015, 19 pages.
Das et al., "Molecular Fluorescence, Phosphorescence, and Chemiluminescence Spectrometry" Analytical Chemistry, Nov. 3, 2011, 29 pages.
Deans, "SPE 7076: Using Chemical Tracers to Measure Fractional Flow and Saturation In-Situ" Society of Petroleum Engineers (SPE), presented at SPE Symposium on improved Methods of Oil Recovery, Apr. 16-17, 1978, 10 pages.
Deschamps et al., "Drilling to the Extreme: the Micro-Coring Bit Concept" IADC/SPE 115187, presented at the IADC/SPE Asai Pacific Drilling Technology Conference and Exhibition, Aug. 25-27, 2008, 12 pages.
Desmette et al., "Drilling Hard and Abrasive Rock Efficiently, or Generating Quality Cuttings? You No Longer Have to Choose . . . " SPE 116554, Society of Petroleum Engineers, 2008 SPE Annual Technical Conference and Exhibition, Sep. 21-24, 2008, 19 pages.
Du et al., "SPE 93140: Interwell Tracer Tests: Lessons Learnted from past Field Studies" Society of Petroleum Engineers (SPE), presented at SPE Asia Pacific Oil and Gas Conference and Exhibition, Apr. 5-7, 2005, 9 pages.
Dugstad, "Chapter 6: Well-to-well tracer tests" in Petroleum Engineering Handbook, 2007, 651-683, 31 pages.
Dung et al., "Structural and magnetic properties of starch coated magnetite nanoparticles" Journal of Experimental Nanoscience, 4, Sep. 2009, 259-267, 9 pages.
Edwards et al., "Extending the distance range accessed with continuous wave EPR with Gd3+ spin probes at high magnetic fields" Physical Chemistry Chemical Physics, 15(27), 2013, 11313-11326, 14 pages.
El-Aneed et al., "Mass Spectrometry, Review of the Basics: Electrospray, MALDI, and Commonly Used Mass Analyzers" Applied Spectroscopy Reviews, Mar. 16, 2009, 22 pages.
Fichtel et al., "A highly sensitive HPLC method for determination of nanomolar concentrations of dipicolinic acid, a characteristic constituent of bacterial endospores" Journal of Microbiological Methods, 2007, 70, 319-327, 9 pages.
Freeze and Cherry, "Chapter 9: Groundwater Contamination" in Groundwater, Englewood Cliffs, NJ: Prentice-Hall, Inc., 1979, 80 pages.
Galdiga and Greibrokk, "Ultra-trace determination of flurinated aromatic carboxylic acids in aqueous reservoir fluids using solid-phase extraction in combination with gas chromatography-mass spectrometry" Journal of Chromatography, vol. 793, Issue 2, Apr. 1997, 297-306, 10 pages.
Gao et al., "A Surface Functional Monomer-Directing Strategy for Highly Dense Imprinting of TNT at Surface of Silica Nanoparticles" Journal of American Chemical Society, vol. 129, No. 25, Jun. 2007, 7859-7866, 8 pages.
Gardiner et al., "Practical Raman Spectroscopy" Springer-Verlag, 1989, 9 pages.
Ge et al., "Fluorescence modified chitosan coated magnetic nanoparticles for high-efficienct cellular imaging" Nanoscale Res. Lett, 4, Jan. 2009, 287-295, 9 pages.
George et al., "Modified Dipicolinic Acid Ligands for Sensitation and Europium (III) Luminescence" Inorganic Chemistry, vol. 45, No. 4, Feb. 1, 2006, 6 pages.
Georgi, et al., "Advances in Cuttings Collection and Analysis" SPWLA 34th Annual Logging Symposium, Jun. 13-16, 1993, 20 pages.

(56) References Cited

OTHER PUBLICATIONS

Gordon-Grossman et al., "W-Band pulse EPR distance measurements in peptides using Gd3+—dipicolinic acid derivatives as spin labels" Physical Chemistry Chemical Physics, 13(22), 2011, 10771-10780, 10 pages.
Grutzke et al., "Heptacoordinate Heteroleptic Salan (ONNO) and Thiosalan (OSSO) Titanium(IV) Complexes: Investigation of Stability and Cytotoxicity" Inorganic Chemistry 54(14), Jul. 2015, 6697-6706, 10 pages.
Hagoot, "The response of interwell tracer tests in watered-out reservoirs" SPE 11131-MS, in SPE Annual Technical Conference and Exhibition, Society of Petroleum Engineers, Jan. 1982, 21 pages.
Han et al., "Application of Silver-Coated Magnetic Microspheres to a SERS-Based Optofluidic Sensor" The Journal of Physical Chemistry (JPCC), Mar. 7, 2011, 7 pages.
Hardy et al., "A novel fluorescent tracer for real-time tracing of clay transport over soil surfaces" Catena, 141, Jun. 2016, 39-45, 7 pages.
He et al., "Luminescent Europium Chelates Synthesis and Fluorescence Properties" Sensors and Materials (2007), 19(2), 123-132, 10 pages.
Hindle et al., "Dipicolinic acid (DPA) assay revisited and appraised for spore detection" Analyst, 1999, 124: 1599-1604, 6 pages.
Hu et al., "Smart Liquid SERS Substrates based on $Fe_3O_4$/Au Nanoparticles with Reversibility Tunable Enhancement Factor for Practical Quantitative Detection" a natureresearch journal, Scientific Reports, Nov. 27, 2014, 10 pages.
Huseby et al., "Assessing EOR potential from partitioning tracer data" SPE 172808-MS, in SPE Middle East Oil and Gas Show and Conference, Society of Petroleum Engineers, Mar. 2015, 15 pages.
Huseby et al., "SPE-169183-MS: High Quality Flow Information from Tracer Data" Society of Petroleum Engineers (SPE), presented at the SPE Bergen One Day Seminar, Apr. 2, 2014, 9 pages.
Hutchins et al., "SPE-21049: Aqueous Tracers for Oilfield Applications" Society of Petroleum Engineers (SPE), presented at SPE International Symposium on Oilfield Chemistry, Feb. 20-22, 1991, 9 pages.
Invitrogen, "Fluorophores and Their Amine-Reactive Derivatives" Molecular Probs Handbook, A Guide to Fluorescent Probes and Labeling Technologies, 11th Edition, 2010, 88 pages.
Jenkins et al., "Ultratrace Determination of Selected Lanthanides by Luminescence Enhancement" Analytical Chemistry, vol. 68, No. 17, Jan. 1, 1996, 7 pages.
Jun et al., "Multifunctional Silver-Embedded Magnetic Nanoparticles as SERS Nanoprobes and Their Applications" Wiley-VCH Verlag GmbH& Co. KGaA, Weinheim, Jan. 4, 2010, 7 pages.
Kaushik et al., "Gd(III) and Mn(II) complexes for dynamic nuclear polarization: small molecular chelate polarizing agents and applications with site-directed spin labeling of proteins" Physical Chemistry Chemical Physics, 18(39), 2016, 27205-27218, 36 pages.
Khan et al., "Optimizing waterflood management in a giant UAE carbonate oil field using simulation-based streamlines" SPE 171777-MS, in Abu Dhabi International Petroleum Exhibition and Conference, Society of Petroleum Engineers, Nov. 10-13, 2014, 9 pages.
Kneipp et al., "Single Molecule Detection Using Surface-Enhanced Raman Scattering (SERS)" Physical Review Letters, American Physical Society vol. 78, No. 9, Mar. 3, 1997, 4 pages.
Kornberger and Thiele, "Experiences with an Efficient Rate-Management Approach for the 8th Tortonian Reservoir in the Vienna Basin" SPE 166393-PA, SPE Reservoir Evaluation and Engineering, vol. 17, No. 2, May 2014, 12 pages.
Kosynkin and Alaskar, "Oil Industry First Interwell Trial of Reservoir Nanoagent Tracers" SPE 181551-MS, in SPE Annual Technical Conference and Exhibition, Society of Petroleum Engineers, Sep. 2016, 15 pages.
Kramer, "Water-Soluble Dendritic Architectures with Carbohydrate Shells for the Templation and Stabilization of Catalytically Active Metal Nanoparticles" published by ACS, Macromolecules, vol. 38, No. 20, Aug. 27, 2005, 8308-8315, 8 pages.
Labbe et al., "Development of metal-chelating inhibitors for the Class II fructose 1,6-bisphosphate (FBP) aldolase" Journal of Inorganic Biochemistry, 112, Jul. 2012, 49-58, 10 pages.
Lachowicz et al., "Biocompatible and fluorescent superparamagnetic iron oxide nanoparticles with superior magnetic properties coates with charged polysaccharide derivatives" Colloids and Surfaces B: Biointerfaces, 2017, 150, 402-407, 18 pages.
Larsen et al., "Efficient Synthesis of 4,7-Diamino Substituted 1,10-Phenanthroline-2,9-dicarboxamides" Organic Letters, vol. 13, No. 13, Jul. 2011, 3546-3548, 3 pages.
Li et al., "Long persistent phosphors—from fundamentals to applications" Chem. Soc. Rev., 45(8), Apr. 2016, 2090-2136, 48 pages.
Li et al., "Magic Angle Spinning NMR Structure Determination of Proteins from Pseudocontact Shifts" Journal of the American Chemical Society, 135(22), May 2013, 8294-8303, 10 pages.
Li et al., "Superparamagnetic Iron Oxide Nanoparticles as MRI contrast agents for Non-invasive Stem Cell Labeling and Tracking" Theranostics, Jul. 2013, 3(8):595-615, 21 pages.
Li et al., "Thiol-ene reaction: a versatile tool in site-specific labelling of proteins with chemically inert tags for paramagnetic NMR" Chemical Communications, Cambridge, United Kingdom, 48(21), 2704-2706, 2012, 18 pages.
Liu et al., "Photostimulated near-infrared persistent luminescence as a new optical read-out from Cr3+-doped LiGa5O8" Scientific Reports 3, Article 1554, Mar. 2013, 9 pages.
Lomstein and Jorgensen, "Pre-column liquid chromatographic determination of dipicolinic acid from bacterial endospores" Limnology and Oceanography: Methods, Apr. 2012, 10:4, 227-233, 14 pages.
Mahdavi et al., "Preparation, Characterization, and Application of Polyacrylamide-Polystyrene/Bentonite Nanocomposite as an Effective Immobilizing Adsorbent for Remediation of Soil" Chemistry Select, 5, Apr. 2020, 4538-4547, 12 pages.
Mahmoudi et al., "Superparamagnetic iron oxide nanoparticles development surface modification and applications in chemotherapy" Advanced Drug Delivery Reviews, Jan. 2011, 63, 24-46, 23 pages.
Manna et al., "Complexation behavior of trivalent actinides and lanthanides with 1,10-phenanthroline-2,9-dicarboxylic acid based ligands: insight from density functional theory" Physical Chemistry Chemical Physics, vol. 14, No. 31, Jan. 2012, 11060-11069, 10 pages.
Marais, A., et al. "Time-Resolved Fluorescence for Real-Time Monitoring of Both Scale and Corrosion Inhibitors: A Game-Changing Technique" SPE International Oilfield Scale Conference and Exhibition. OnePetro, May 2016, 11 pages.
Marchetti et al., "Fluorous affinity chromatography for enrichment and determination of perfluoroalkyl substances" Annual Review of Analytical Chemistry vol. 84, Jul. 19, 2012, 8 pages.
Martinez et al., "Polysaccharide-based Nanoparticles for Controlled Release Formulations" The Delivery of Nanoparticles, Published May 2012, 185-222, 40 pages.
Martini et al., "How to Monitor Scale Inhibitor Squeeze using Simple TRF Tracers" Society of Petroleum Engineers, presented at the SPE International Symposium on Oilfield Chemistry held in the Woodlands, Texas, Apr. 13-15, 2015, 8 pages.
Melton et al., "Complexes of Greatly Enhanced Thermodynamic Stability and Metal Ion Size-Based Selectivity, Formed by the Highly Preorganized Non-Macrocyclic Ligand 1,10-Phenanthroline-2,9-dicarboxylic Acid: A Thermodynamic and Crystallographic Study" Inorganic Chemistry vol. 45 No. 23, Jun. 2006, 9 pages.
Moyner et al., "The Application of Flow Diagnostics for Reservoir Management" Society of Petroleum Engineers (SPE), Apr. 2015, 18 pages.
Muller and Seubert, "Ultra trace determination of fluorobenzoic acids in tap and reservoir water using solid-phase extraction and gas chromatography-mass spectrometry" Journal of Chromatography A, 1260, Oct. 2012, 7 pages.
Nie et al., "Probing Single Molecules and Single Nanoparticles by Surface-Enhanced Raman Scattering" Science, vol. 275, No. 5303, Feb. 1997, 1102-1106, 6 pages.
Ogden et al., "Complexation of Am(III) and Nd(in) by 1,10-Phenanthroli ne-2,9-Di carboxylic Acid" Journal of Solution Chemistry, vol. 42, No. 1, pp. 211-225, 2013, 15 pages.

(56) References Cited

OTHER PUBLICATIONS

Ouali et al., "Analysis of Paramagnetic NMR Spectra of Triple-Helical Lanthanide Complexes with 2,6-Dipicolinic Acid Revisited: A New Assignment of Structural Changes and Crystal-Field Effects 25 Years Later" Inorganic Chemistry, 41(6), Feb. 2002, 1436-1445, 10 pages.

Pallenberg et al. "Synthesis and Characterization of Some Copper(I) Phenanthroline Complexes" Inorg. Chem. 1995, 34, 2833-2840, 8 pages.

Park et al., "Application of montmorillonite in bentonite as a pharmaceutical excipient in drug delivery systems" Journal of Pharmaceutical Investigation, 46, May 2016, 363-375, 13 pages.

Parker and Williams, "Getting excited about lanthanide complexation chemistry" Journal of the Chemical Society, Dalton Transactions, vol. 18, 1996, 16 pages.

Parker et al., "Being excited by lanthanide coordination complexes: aqua species, chirality, excited-state chemistry, and exchange dynamics" Chemical Reviews, vol. 102, Issue 6, May 2002, 34 pages.

Petoud et al., "Brilliant SM, Eu, Tb, and Dy Chiral Lanthanide Complexes with Strong Circularly Polarized Luminescence" Journal fo the American Chemical Society (JACS), Dec. 15, 2006, 7 pages.

Potapov et al., "Nanometer-Scale Distance Measurements in Proteins Using Gd3+ Spin Labeling" Journal of the American Chemical Society, 132(26), Jun. 2010, 9040-9048, 9 pages.

Qianming et al., "Bspda Synthesis and its Europium (III) Complexes' Fluorescence" Chemical Industry Times, Jul. 2005, 19(7): 38-41, 4 pages (English Abstract).

Rashdan et al., "Effect of the preparation route, PEG and annealing on the phase stability of Fe3O4 nanoparticles and their magnetic properties" Journal of Experimental Nanoscience, vol. 8, No. 2, 2013, 210-222, 13 pages.

Rovani, "Enhanced Oil Recovery: Aqueous Flow Tracer Measurement" WRI-09-R002, OSTI.Gov, Technical Report, U.S. Department of Energy, Feb. 2009, 1-18, 25 pages.

Rowan et al., "Dynamic Covalent Chemistry" Angewante Chemie International Edition, Mar. 15, 2002, 55 pages.

Sabbatini et al., "Luminescent lanthanide complexes as photochemical supramolecular devices" Coordination Chemistry Reviews, vol. 123, issue 1-2, Feb. 1993, 28 pages.

Saeki et al., "Upper and lower critical solution temperatures in poly (ethylene glycol) solutions" Polymer, vol. 17, No. 8, Aug. 1976, 685-689, 5 pages.

Sammes and Yshioglu, "Modern bioassays using metal chelates as luminescent probes" Natural Product Reports, vol. 31, No. 1, 1996, 28 pages.

Sanni et al., "A field case study of inter-well chemical tracer test" in SPE International Symposium on Oilfield Chemistry, Society of Petroleum Engineers, Apr. 2015, 17 pages.

Sanni et al., "Pushing the envelope of residual oil measurement: A field case study of a new class of inter-well chemical tracers" Journal of Petroleum Science and Engineering, vol. 163, 2018, 19 pages.

Santarelli et al., "Formation Evaluation From Logging on Cuttings" SPE Reservoir Evaluation and Engineering, presented at the 1996 SPE Permian Basin Oil and Gas Recovery Conference, Mar. 27-29, 1996, published Jun. 1998, 7 pages.

Schmidt et al., "Copper dipicolinates as peptidomimetic ligands for the Src SH2 domain" Bioorganic & Medicinal Chemistry Letters, 14(16), 4203-4206, Aug. 2004, 4 pages.

Schmidt et al., "Synthesis of Mono- and Dinuclear Vanadium Complexes and Their Reactivity toward Dehydroperoxidation of Alkyl Hydroperoxides" Inorganic Chemistry 56(3), 2017, 1319-1332, 14 pages.

Selvin et al., "Principles and biophysical applications of lanthanide-based probes" Annual Review of Biophysics and Biomolecular Structure, Jun. 2002, 28 pages.

Serres-Piole et al., "Direct sensitive simultaneous determination of fluorinated benzoic acids in oil reservoir waters by ultra high-performance liquid chromatography-tandem mass spectrometry" Journal of Chromatography A, 1218, Aug. 2011, 6 pages.

Serres-Piole et al., "Water tracers in oilfield applications: Guidelines" Elsevier Ltd., Journal of Science and Engineering, Nov. 2012, 18 pages.

Shamsijazeyi et al., "Polymer-Coated Nanoparticles for Enhance Oil Recovery" Journal of Applied Polymer Science, vol. 131, No. 15, Aug. 5, 2014, 13 pages.

Shook et al., "SPE 124614: Determining Reservoir Properties and Flood Performance from Tracer Test Analysis" Society of petroleum Engineers (SPE), presented at SPE Annual Technical Conference and Exhibition, Oct. 4-7, 2009, 19 pages.

Solomon et al., "Synthesis and Study of Silver Nanoparticles" Journal of Chemical Education vol. 84, No. 2, 2007, 332-325, 4 pages.

Song et al., "SERS-Encoded Nanogapped Plasmonic Nanoparticles: Growth of Metallic Nanoshell by Templating Redox-Active Polymer Brushes" Journal of the American Chemical Society (JACS), Apr. 28, 2014, 4 pages.

Stiles et al., "Surface-Enhanced Raman Spectroscopy" Annual Review of Analytical Chemistry, vol. 1, No. 1, Jul. 2008, 601-626, 29 pages.

Stryer et al., "Diffusion-enhanced fluorescence energy transfer" Annual Review of Biophysics and bioengineering, vol. 11, Issue 1, 1982, 21 pages.

Su et al., "A Dipicolinic Acid Tag for Rigid Lanthanide Tagging of Proteins and Paramagnetic NMR Spectroscopy" Journal of the American Chemical Society, 130(32), Jul. 2008, 10486-10487, 2 pages.

Tang et al., "Synthesis and fluorescence properties of Tb(III) complexes with pyridine-2,6-dicarboxylic acid derivatives" Journal of Central South University of Technology (English Edition), 15(5), Oct. 2008, 599-605, 7 pages.

Tang et al., "Synthesis of Novel Derivatives of Pyridine-2,6-dicarboxylic Acid" Synthetic Communications: An International Journal for Rapid Communication of Synthetic Organic Chemistry, 36(14), Jun. 2006, 2027-2034, 9 pages.

Tang et al., "Synthesis of Eu(III) and Tb(III) Complexes with Novel Pyridine-2,6-Dicarboxylic Acid Derivatives and Their Fluorescence Properties" Front. Chem. China, 2006, 4:, 408-413, 6 pages.

Thomas et al., "Deployment and Detection of a Novel Barcoded Advanced Tracers System for the Optimization of Improved Waterflood Recovery in Hydrocarbon Reservoirs" SPE-194872-MS, SPE Middle East Oil and Gas Show and Conference. Society of Petroleum Engineers, 2019, 10 pages.

Tian et al., "Off-Resonant Gold Superstructures as Ultrabright Minimally Invasive Surface-Enhanced Raman Scattering (SERS) Probes" American Chemical Society, Jul. 2015, 7 pages.

Toulhoat, "Experimentation and Modelling of U, Th and Lanthanides Transport in Fissured Rocks: Influence of Complexation" MRS Proceedings, vol. 50, Jan. 1, 1985, 8 pages.

Wahajuddin et al., "Superparamagnetic iron oxide nanoparticles: Magnetic nanoplatforms as drug carriers" International Journal of Nanomedicine, 7, Jul. 2012, 3445-3471, 27 pages.

Wang et al., "The Design and Implementation of a Full Field Inter-Well Tracer Program on a Giant UAE Carbonate Oil Field" in Abu Dhabi International Petroleum Exhibition and Conference, Society of Petroleum Engineers, SPE-177527-MS, Nov. 2015, 8 pages.

Wu et al., "A reusable biosensor chip for SERS-fluorescence dual mode immunoassay" Proc. SPIE 9543, Third International Symposium on Laser Interaction with Matter, 954317, May 4, 2015, 6 pages.

Wu et al., "A SERS-Assisted 3D Barcode Chip for High-Throughput Biosensing" Small Journal vol. 11, No. 23, Jun. 11, 2015, 9 pages.

Xu et al., "Superparamagnetic Photonic Crystals" Adv. Mater., Nov. 2001, 13, 1681-1683, 4 pages.

Xu et al., "Synthesis and Utilization of Monodisperse Superparamagnetic Colloidal Particles for Magnetically Controllable Photonic Crystals" Chem. Mater., 14(3), 2002, 1249-1256, 8 pages.

(56) References Cited

OTHER PUBLICATIONS

Xu et al.., "Measurement of two-photon excitation cross sections of molecular fluorophores with data from 690 to 1050 nm" Journal of the Optical Society of America B, Mar. 1996, 11 pages.

Yang et al., "The Co-Luminescence Groups of Sm-La-pyridyl Carboxylic Acids and the Binding Characteristics between the Selected Doped Complex and Bovine Serum Albumin" Bulletin of the Korean Chemical Society 33(4), Apr. 20, 2012, 1303-1309, 7 pages.

Yang et al., "Paramagnetic labeling of proteins and pseudocontact shift in structural biology" Chinese Journal of Magnetic Resonance, 2014, 31(2):155-171, 12 pages (English Abstract).

Yu et al., "Adsorption of proteins and nucleic acids on clay minerals and their interactions: A review" Applied Clay Science, 80-81, Aug. 2013, 443-452, 10 pages.

Zamberi et al., "SPE 166005: Improved Reservoir Surveillance Through Injected Tracers in a Saudi Arabian Field: Case Study" Society of Petroleum Engineers (SPE), presented at SPE Reservoir Characterization and Simulation Conference and Exhibition, Sep. 2013, 15 pages.

Zemel, "Chapter 3: Interwell Water Tracers" Tracers in the Oil Field, vol. 43, 1st Edition, Elsevier Science, Jan. 13, 1995, 47 pages.

Zhang et al., "Water adsorption on kaolinite and illite after polyamine adsorption" Journal of Petroleum Science and Engineering, 142, Jun. 2016, 13-20, 8 pages.

Zhao et al., "Chromatographic Separation of Highly Soluble Diamond Nanoparticles Prepared by Polyglycerol Grafting" Angewandte Chemie International Edition, vol. 50, No. 6, Feb. 7, 2011, 1388-1392, 5 pages.

Zhou et al., "Upconversion luminescent materials: advances and applications" Chem Rev., Jan. 14, 2015, 71 pages.

Kaewsaneha et al., "Immobilization of fluorescein isothiocyanate on magnetic polymeric nanoparticle using chitosan as spacer," Journal of Colloid and Interface Science, 2012, 377:145-152, 8 pages.

\* cited by examiner (i) (ii) (iii)

1400

MULTIFUNCTIONAL FLUORESCENT TAGS FOR SUBTERRANEAN APPLICATIONS

TECHNICAL FIELD

This document relates to methods and compositions used in tagging and tracing subterranean cuttings produced during drilling.

BACKGROUND

Subterranean cuttings that are produced during drilling operations can provide critical information, for example, the lithology and mineral composition of the subterranean formation. However, cuttings produced at the drill head travel to the surface via the annulus, and it is difficult to accurately determine or even estimate lag time during this upward trip. This makes analyzing the depth at which these cutting originated difficult.

Mud tracers can be used to determine mud cycle time, for example, the circulation time, however, the estimating the depth of cuttings based on circulation time is inaccurate, especially if the wellbore includes long horizontal sections or the return trip time is lengthy. For example, when the return trip is longer than half an hour, it is common to have depth uncertainties of more than 6 meters (20 feet). This, in turn, compounds errors in characterizing the formation according to the depth of the cuttings. More efficient mud tracer materials and rapid detection techniques for these tracers are highly desirable.

SUMMARY

This disclosure describes compositions and methods that can be used to determine the origin depth of a wellbore cutting.

In some implementations, a nanoparticle tag includes a fluorescent core and a polymer shell. The fluorescent core includes an up-converting material. The polymer shell includes styrene-based monomers or methacrylate-based monomers, or any combination thereof.

In some implementations, a nanoparticle tag includes a fluorescent core and a polymer shell. The fluorescent core includes a long-persistent fluorescent material. The long-persistent fluorescent material consists essentially of $CaTiO_3:Pr^{3+}$, $CaAl_2O_4:Eu^{2+}/Nd^{3+}$, $Ca_3(PO_4)_2:Sm^{3+}/Mn^{2+}$, $SrAl_2O_4:Eu^{2+}/Dy^{3+}$, $SrMgSi_2O_7:Eu/Dy$, $Sr_4Al_{14}O_{25}:Eu/Dy$, $ZnGa_2O_4:Cr^{3+}$, $LiGa_5O_8:Cr^{3+}$, $Zn_3Ga_2Ge_2O_{10}:Cr^{3+}/Pr^{3+}$, or $Zn_3Ga_2Ge_2O_{10}:Cr^{3+}/Eu^{3+}$, or any combinations thereof. The polymer shell includes styrene-based monomers or methacrylate based monomers, or any combinations thereof.

In some implementations, a nanoparticle tag includes a fluorescent core and a polymer shell. The fluorescent core includes an encapsulated lanthanide complex where the encapsulated lanthanide complex includes a lanthanide ion where all metal binding sites of the lanthanide ion are occupied by ligands. The polymer shell includes styrene-based monomers or methacrylate-based monomers, or any combination thereof.

In some implementations, a method of determining the origin location of a subterranean rock sample includes mixing a nanoparticle tag into a fluid, flowing the fluid through a work string into a subterranean formation, recovering subterranean rock samples from the subterranean formation, and determining an origin location of the subterranean rock sample by detecting the presence of the nanoparticle tag on the subterranean rock sample.

In some implementations, a method of characterizing the origin depth of a cut rock sample includes using a barcoded tracer to determine the origin location based on the travel time of the produced rock cuttings from a drill head to the surface via an annulus. The barcoded tracer includes a nanoparticle tag with a fluorescent core and a polymer shell. The method includes using fluorescence detection to detect the presence of the nanoparticle tags on the cut rock sample and analyzing the polymer shell to yield fingerprint monomer information of the nanoparticle tags on the cut rock sample.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Figure 1:
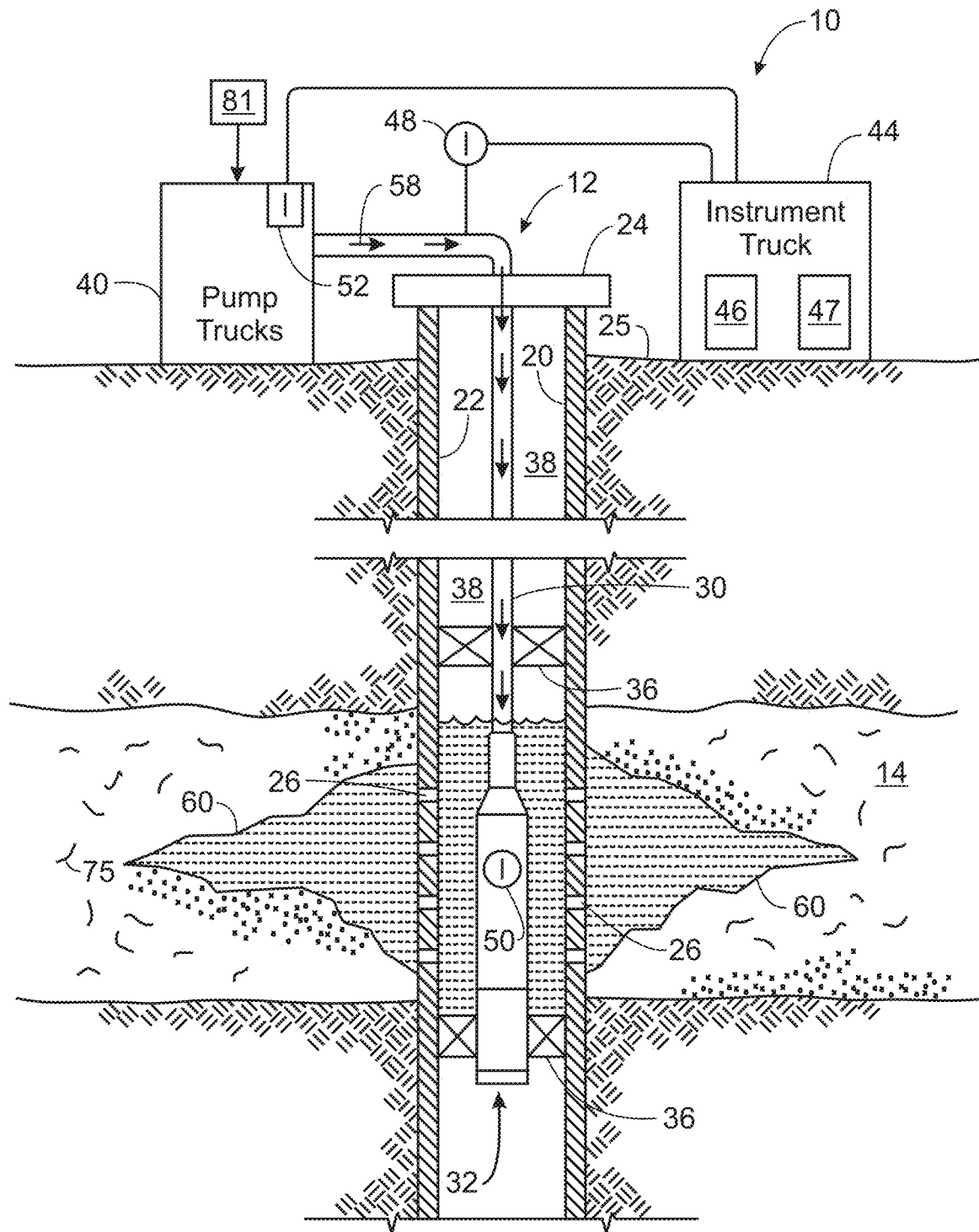
FIG. 1 shows an example of a drilling treatment for a well.

Provided in this disclosure, in part, are methods, compositions, and systems for accurately determining the origin depth or location of cuttings produced during drilling. FIG. 1 illustrates an example of a drilling operation 10 for a well 12. The well 12 can be in a wellbore 20 formed in a subterranean zone 14 of a geological formation in the Earth's crust. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation including natural fractures 60 in rock formations containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For a drilling treatment 10, a work string 30 can be disposed in the wellbore 20. The work string 30 can be coiled tubing, sectioned pipe, or other suitable tubing. A drilling tool or drill bit 32 can be coupled to an end of the work string 30. Packers 36 can seal an annulus 38 of the wellbore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump drilling mud 58 down the work string 30 to lubricate and cool the drilling tool or drill bit 32, maintain hydrostatic pressure in the wellbore, and carry subterranean cuttings to the surface. The drilling mud 58 can include a fluid pad, proppants, flush fluid, or a combination of these components. The pump trucks 40 can include mobile vehicles, equipment such as skids, or other suitable structures.

One or more instrument trucks 44 can also be provided at the surface 25. The instrument truck 44 can include a drilling control system 46 and a drilling simulator 47. The drilling control system 46 monitors and controls the drilling treatment 10. The drilling control system 46 can control the pump trucks 40 and fluid valves to stop and start the drilling treatment 10. The drilling control system 46 communicates with surface and subsurface instruments to monitor and control the drilling treatment 10. In some implementations, the surface and subsurface instruments may comprise surface sensors 48, down-hole sensors 50, and pump controls 52.

Additives 81 can be mixed with drilling mud 58 and flowed through the reservoir. In some implementations, the additives are tags that can embed into, permanently, or semi-permanently decorate the surface of cuttings produced by the drill bit. When drilling mud is introduced into the subterranean formation via the drill bit, tags that are included in the mud will contact the subterranean formation for the first time at the drill head. If the depth or relative position of the drill head and the lag time of the mud in the drill string are known, cuttings that are tagged with a specific tag can be accurately assigned an origin depth or position. Accordingly, the origin location of the cutting can be accurately determined.

In some implementations, more than one tag can be used. The tags can be uniquely identifiable. Accordingly, cuttings that include or are decorated with a first tag can be assigned to a first depth or position, and cuttings that include or are decorated with a second tag can be assigned to a second depth or position.

The tags described herein are multi-modal tags, meaning that each tag includes a unique combination of features that can be orthogonally detected. Accordingly, the variations in the features of the tags can act as a uniquely identifiable "barcode." In addition, the combination of orthogonally detectable features expands the number of uniquely identifiable tags that can be produced and uniquely identified.

In addition, the tags described herein can be rapidly detected with high sensitivity. In some implementations, the tags can be detected at the drilling site, making detection more rapid and allowing the drill operators to make drilling decisions based on real-time data.

Another advantage of the tags described herein is that they can be identified in two stages. In a first stage, a first analysis can be conducted quickly at the drilling site using a first procedure. This allows for the easy separation of tagged materials from untagged materials. After the first analysis, the tagged materials can be subjected to a second analysis, either off-site or on-site. Accordingly, the multi-stage approach includes a first analysis that acts as a screening process. The screening process reduces the number of cuttings that need to be transported and subsequently analyzed. This approach saves time, labor, and laboratory costs. In addition, this multi-modal identification allows for rapid identification and real-time analysis that can aid in drilling operations.

The tags can include multi-functional composite nanoparticles. As used herein, in some embodiments, a nanoparticle is less than 1000 nm in diameter. In some embodiments, the nanoparticle is less than 5000 nm in diameter. In some embodiments, the nanoparticle is less than 10 µm in diameter.

Figure 2:
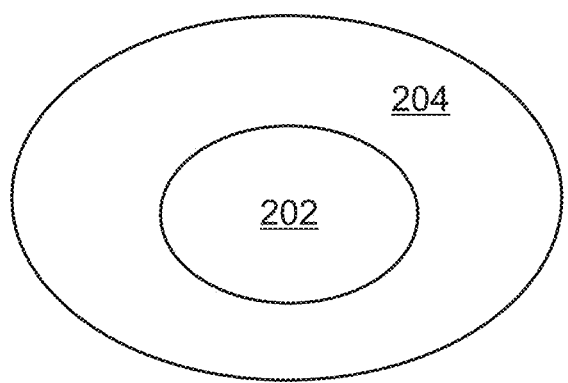
FIG. 2 shows an example schematic of a nanoparticle tag.

FIG. 2 shows an example schematic of a multi-modal tag 200. In some implementations, the tags include an inorganic fluorescent core 202 and a thermally depolymerizable or degradable shell 204. The core 202 and the shell 204 can be determined by orthogonal detection means. For example, the fluorescent core can be detected by fluorescence spectroscopy and the shell can be detected by mass spectrometry. Accordingly, a library of tags can be created where each tag includes a unique combination of fluorescence and mass spectrometry signals. The tags can therefore include "barcodes" and can be uniquely identified.

As described herein, the multi-modal nature of these tags allows for a two-stage analysis. In a first stage, a rapid, fluorescence measurement can be made. Cuttings that fluoresce (i.e., contain a fluorescent tag), can be manually or automatically separated and can be designated for further analysis. In a second stage, the depolymerizable or degradable shell can be analyzed with mass spectrometry.

Figure 14:
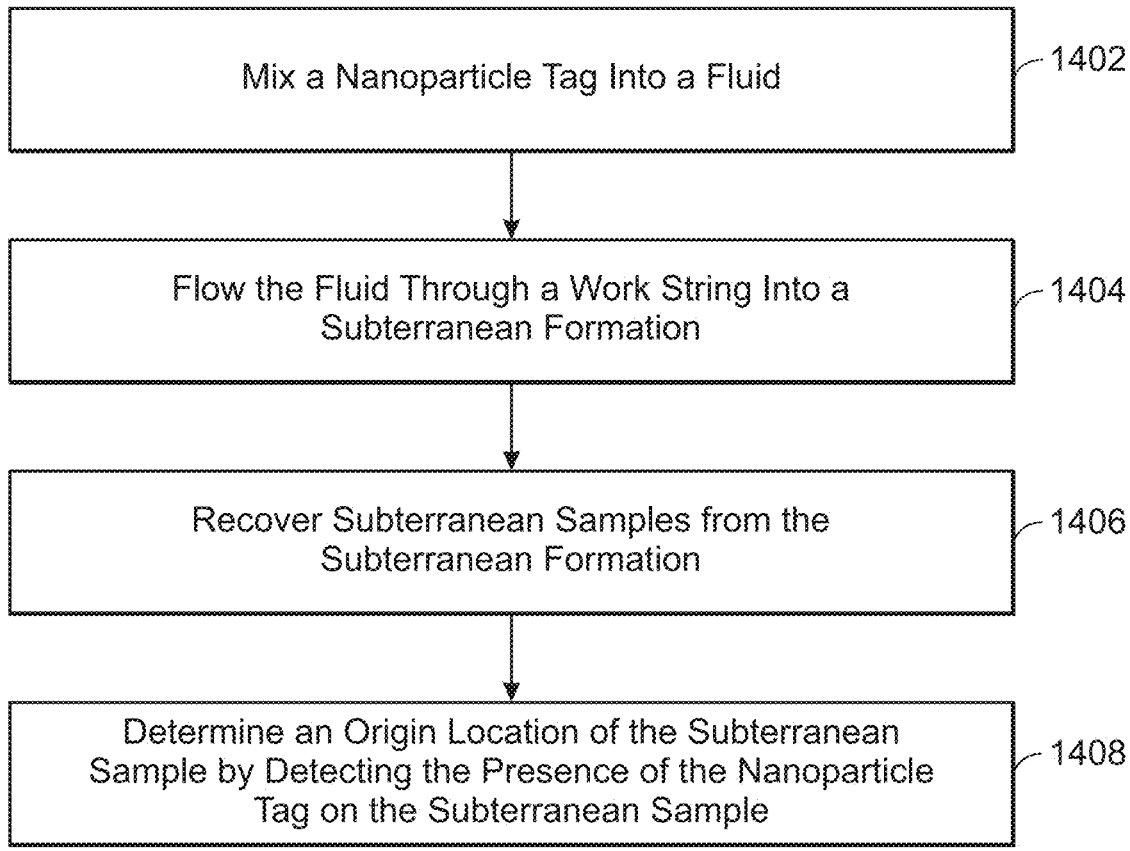
FIG. 14 shows a flowchart of an example method of determining the origin location of a subterranean rock sample.

For example, FIG. 14 shows a flowchart of an example method 1400 of determining the origin location of a subterranean rock sample. At 1402, the nanoparticle tag is mixed into a fluid. At 1404, the fluid is flowed through a work string into a subterranean formation. At 1406, subterranean rock samples are recovered from the subterranean formation. At 1408, the origin location of the subterranean rock sample is determined by detecting the presence of the nanoparticle tag on the subterranean rock sample.

In some implementations, the inorganic fluorescent core 202 can include an up-conversion nanoparticle. Up-conversion refers to a phenomenon where a material absorbs two or more incident photons with relatively low energy and emits a single photon with higher energy. Generally, absorption occurs in the near-infrared range, and emission occurs in the visible, near-infrared (at shorter wavelengths) or ultraviolet regions of the electromagnetic spectrum. Up-conversion can occur in rare earth element doped oxides. In contrast, most of the materials that are typically encountered during drilling, for example rock, mud, and crude oil, do not display up-conversion properties. Therefore, a tag that includes up-conversion properties can be easily identified in mud or subterranean materials, without interference from background up-conversion signals. Further, the lack of up-conversion properties in the drilling materials and naturally occurring subterranean materials negates the need for complex sample preparation, for example, separation or purification steps.

The up-converting nanoparticles in the core 202 can include rare-earth element doped oxides. In addition to displaying up-conversion properties, these materials are environmentally friendly and can be used in subterranean formations. The up-converting nanoparticles can include a crystal structure that is doped with a rare earth element. The rare earth elements can include ytterbium (Yb), erbium (Er), holmium (Ho), thulium (Th), and combinations thereof. The crystal structure can include sodium salts of yttrium fluoride (NaYF$_4$), sodium salts of gadolinium fluoride (NaGdF$_4$), calcium titanate (CaTiO$_3$) and ytterbium phosphate (YPO$_4$). Examples of the nanoparticles including these elements and salts are shown in Table 1. The fluorescent core can consist essentially of the nanoparticles listed in Table 1, or any combination thereof. In some implementations, the fluorescent core and include a binder or other inactive material.

TABLE 1

Examples of Up-Converting Nanoparticle Cores

| |
|---|
| NaYF$_4$:Yb/Er |
| NaYF$_4$:Yb/Ho |
| NaYF$_4$:Yb/Tm |
| NaGdF$_4$:Yb/Er |
| NaGdF$_4$:Yb/Ho |
| NaGdF$_4$:Yb/Tm |
| YPO$_4$:Yb/Er |
| YPO$_4$:Yb/Ho |
| YPO$_4$:Yb/Tm |
| CaTiO$_3$:Yb/Er |
| CaTiO$_3$:Yb/Ho |
| CaTiO$_3$:Yb/Tm |

The nanoparticle cores as shown in Table 1 emit light in different colors at a visible range under near infrared (NIR) excitation. The visible spectrum is between 400 nm and 700 nm. For example, nanoparticles doped with Yb/Tm can emit blue light, nanoparticles doped with Yb/Er can emit green light, and nanoparticles doped with Yb/Ho can emit orange light. Accordingly, any cut rock samples that are recovered at the surface can be excited with a near infrared source. Any rock samples that emit visible light can be collected and allocated for subsequent mass spectrometry analysis.

In some implementations, the inorganic fluorescent core 202 can include a long-persistent nanoparticle. Long-persistent or persistent luminescence is a type of photoluminescence where the emission persists for seconds, minutes, hours, or even days after ceasing the excitation irradiation. This is also referred to as phosphorescence or "afterglow." Most of the materials encountered during drilling, for example, rock, mud, and crude oil, do not exhibit persistent luminescence. Therefore, a tag that includes a long-persistent material can be uniquely identified without background luminescence signals from surrounding materials. In addition, long-persistent luminescent nanoparticles can be detected without constant external illumination, for example, in the dark, to avoid background interference from drilling materials, such as naturally occurring auto-fluorescence or light scattering.

The long-persistent nanoparticles can include crystals structures doped with praseodymium ions ($Pr^{3+}$), europium ions ($Eu^{2+}$), neodymium ions ($Nd^{3+}$), samarium ions ($Sm^{3+}$), manganese ions ($Mn^{2+}$), dysprosium ions ($Dy^{3+}$), chromium ions ($Cr^{3+}$), or combinations thereof. The crystal structures can include calcium titanium oxide (CaTiO$_3$), calcium aluminum oxide (CaAl$_2$O$_4$), calcium phosphate (Ca$_3$(PO$_4$)$_2$, SrAl$_2$O$_4$, Sr$_4$Al$_{14}$O$_{25}$, SrMgSi$_2$O$_7$, zinc gallium oxide (ZnGa$_2$O$_4$), zinc gallogermanates (Zn$_3$Ga$_2$Ge$_2$O$_{10}$), or lithium gallates (LiGa$_5$O$_8$). Examples of long-persistent cores including these elements are shown in Table 2.

TABLE 2

Examples of Long-Persistent Nanoparticle Cores

| |
|---|
| CaTiO$_3$:Pr$^{3+}$ |
| CaAl$_2$O$_4$:Eu$^{2+}$/Nd$^{3+}$ |
| Ca$_3$(PO$_4$)$_2$:Sm$^{3+}$/Mn$^{2+}$ |
| SrAl$_2$O$_4$:Eu$^{2+}$/Dy$^{3+}$ |
| SrMgSi$_2$O$_7$:Eu$^{2+}$/Dy$^{3+}$ |
| Sr$_4$Al$_{14}$O$_{25}$:Eu$^{2+}$/Dy$^{3+}$ |
| ZnGa$_2$O$_4$:Cr$^{3+}$ |
| Zn$_3$Ga$_2$Ge$_2$O$_{10}$:Cr$^{3+}$/Pr$^{3+}$ |
| Zn$_3$Ga$_2$Ge$_2$O$_{10}$:Cr$^{3+}$/Eu$^{3+}$ |
| LiGa$_5$O$_8$:Cr$^{3+}$ |

These long-persistent nanoparticles emit different wavelengths in visible or NIR ranges after being charged by ultraviolet (UV) or visible light, for example the UV and visible portion of sunlight or by a flashlight. Since the long-persistent cores continue to phosphoresce even after removal of the excitation source, the images of the glowing long-persistent nanoparticles can be captured in darkness. The detection sensitivity of these nanoparticles can be achieved at a pico-gram ($10^{-12}$ g) level for pure powder samples.

Accordingly, any cut rock samples that are recovered at the surface can be excited with a UV or visible light source. Any rock samples that emits a long-persistent signal can be collected and allocated for subsequent mass spectrometry analysis.

In some implementations, the nanoparticle tag can include an encapsulated lanthanide complex. Lanthanides have unique time-resolved luminescence effects. Accordingly, lanthanides can be identified with a time-gated fluorescence imaging method. For example, a rock sample can be irradiated with UV light at 254 nm, followed by a delay, followed by a fluorescence measurement. The delay can be configured to be long enough that any natural fluorescence decays, while the fluorescence of the lanthanide persists. Therefore, by making the fluorescence measurement delayed, the lanthanide ions can be detected without background interference from any naturally fluorescent material present in the rock sample.

In some implementations, the lanthanide ions in the tags are complexed. For example, the lanthanide ions can be complexed with LX-type ligands, or with dative (L2) type ligands. LX-type ligands include β-diketonates, for example 1,1,1-trifluoro-3-(2-theonyl)acetone (TTA) and benzyl trifluoroacetone (BTFA). These ligands can act as an antenna for energy transfer, which adsorbs energy from an excitation light and transfers the energy to a certain energy level of the rare earth ions, which subsequently enhances the emission of the rare earth ions. Dative (L2) ligands include trioctylphosphine oxide (TOPO), bipyridine, and phenanthroline. In some implementations, a combination of LX-type and dative (L2) ligands are used to coordinate a lanthanide ion. Suitable lanthanide ions include $Eu^{3+}$, $Tb^{3+}$, $Sm^{3+}$ and $Dy^{3+}$. The fluorescence can be measured by time-resolved fluorescence spectroscopy.

In some implementations, the nanoparticle core is coated with a shell 204, for example a thermally depolymerizable or degradable polymer. Any of the cores described above, i.e., the up-converting nanoparticles, long-persistent nanoparticles, and complexed lanthanide ions can be coated with a polymer shell. The polymer shell adds another layer of detection to an orthogonal detection scheme. For example, the polymer shell can include monomer fingerprint information. Monomer fingerprint information, as used herein, includes variations in monomer composition of the polymer shell, which can be determined by various techniques. For example, the monomer fingerprint information may be determined by spectroscopic techniques, including, for example, Fourier transform infrared spectroscopy (FTIR), among others. Further, when the polymer is uniquely identifiable, combinations of uniquely identifiable cores and uniquely identifiable polymer coatings expand the number of tags that are available and can be uniquely identified. Detection of the polymer can be orthogonal to the detection of the nanoparticle core. For example, while the nanoparticle core can be detected with fluorescence measurements, the polymer core can be detected with mass spectrometry. Accordingly, the uniquely identifiable core and uniquely identifiable polymers can be mixed and matched to create a library of uniquely identifiable tags.

In some implementations, the polymer can be detected by mass spectrometry based on its constituent monomers. For example, the polymer coating can decompose into constituent monomers at elevated temperatures. Therefore, the detection of these individual constituent monomers with mass spectrometry can be accomplished with a pyrolysis-gas chromatography mass spectrometry (pyrolysis-GC/MS) procedure.

In some implementations, the polymer coating is polystyrene or a polystyrene derivative. Styrene based polymers cleanly decompose into their constituent monomers at elevated temperatures. Accordingly, the entire polymer mass contributes to the generation of detectable units, maximizing atom economy. In addition, styrene based polymers can be coated onto nanoparticles to form a polymer shell. The styrene based polymer can include monomers that are derivatives of styrene, p-methylstyrene, p-methoxystyrene, 2,4-dimethylstyrene, 2,4,6-trimethylstyrene, 4-chlorostyrene, 4-bromostyrene, or mixtures thereof.

In some implementation, the polymer shell includes a methacrylate. For example, the polymer shell can include monomers that are derivatives of acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, 2-chloroethyl methacrylate, or mixtures thereof. In some implementation, the polymer shell can include both styrene-based and methacrylate-based monomers.

A typical procedure for generating the polymer-coated nanoparticle includes providing a suspension of the nanoparticles in water at a concentration of 1-5 wt %, adding an initiator and heating the solution, and injecting monomers, for example, styrene monomers, into the solution. After adding the monomers, the reaction is allowed to proceed for 30 minutes and then cooled to room temperature. The weight ratio of nanoparticle core to polymer shell in the synthesized composite particles can be adjusted by adjusting the relative concentration of the nanoparticle suspension and monomer solution.

The synthesized composite nanoparticles are water-soluble and therefore mix readily with water-based drilling mud, for example simply by mechanically stirring the tags into a mud. For an oil-based drilling mud, the synthesized composite nanoparticles can be surface-modified by surfactant to form a microemulsion, and then mixed with the mud. The tags described herein are stable in either water-based or oil-based drilling muds.

Tags that are introduced into drilling mud first contact the subterranean formation at the drill bit. These tags can embed into, or permanently or semi-permanently decorate cuttings produced by the drill bit. When the drill bit location and mud lag time to drill bit is known, the cuttings recovered at the surface of the wellbore can be identified and correlated to a known subterranean location or depth.

Cuttings that are recovered at the surface can be rapidly screened on-site, for example near the oil well or drilling operation, by fluorescence measurement. In some implementations, only rock samples or cuttings that are exhibiting fluorescence, i.e. tagged cuttings, will be brought to a lab for further analysis. This significantly narrows down the number of rock samples for the subsequent labor and cost intensive lab analysis. A lab protocol has been developed to extract the tags from the cuttings recovered from water-based mud. Typically, collected cut rock samples are rinsed by water and ethanol to remove unattached mud on their surface, and then the rock samples are placed in 10 ml deionized (DI) water and sonicated for 1 hour. The water-soluble tracer is present in the sonicated solution and can be collected by filtration for analysis. Organic solvent such as chloroform can be used to extract organic soluble part of the tracers for analysis. Subsequent analysis can include pyrolysis GC/MS or gas chromatography—flame ionization mass spectrometry (GC-FID/MS). The detectability of the tags at as little of 1 ppm in drilling mud can be achieved.

Example 1: Synthesis of Up-Conversion Nanoparticles

Figure 3:
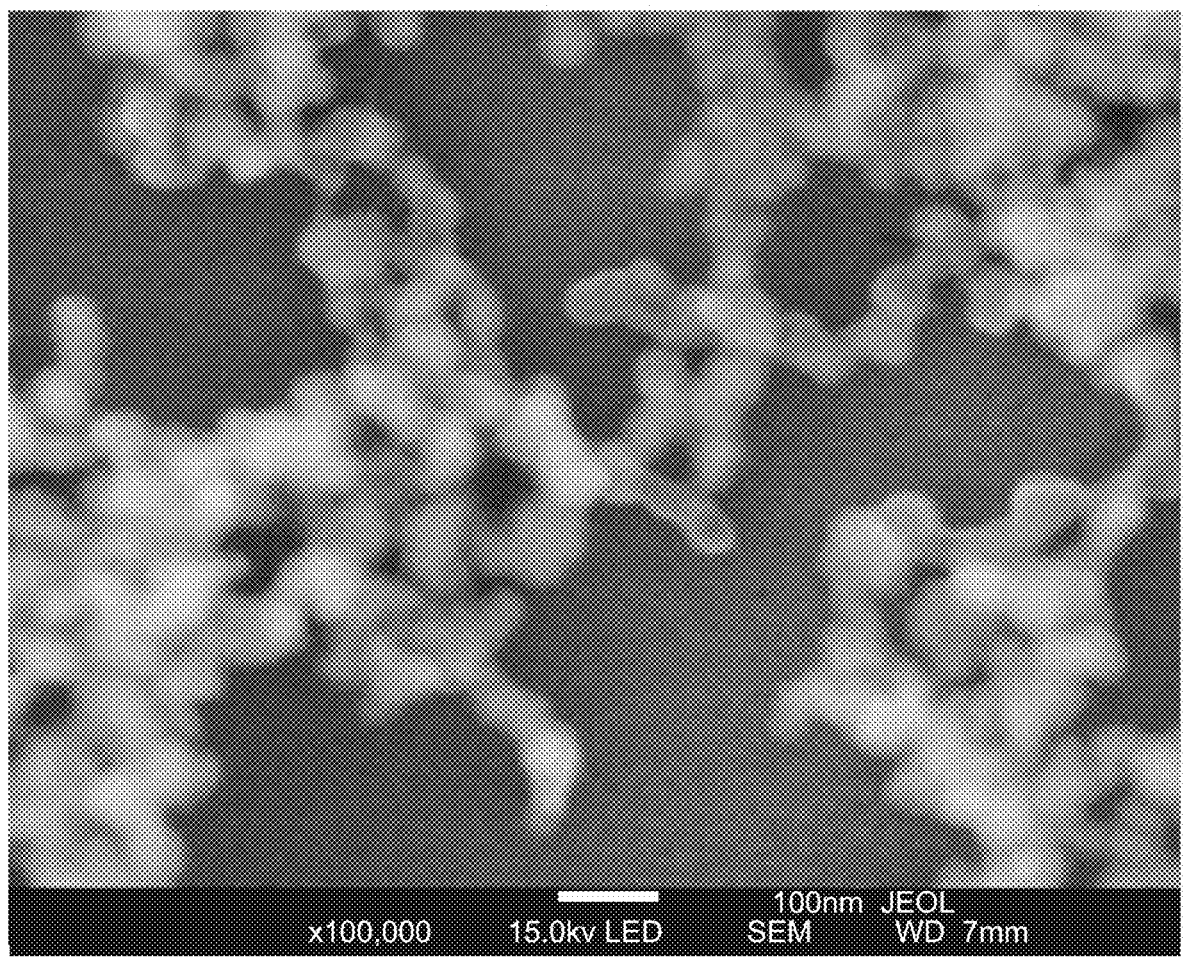
FIG. 3 shows an SEM image of an example up-converting $NaYF_4:Yb/Er$ nanoparticle core.
Figure 4:
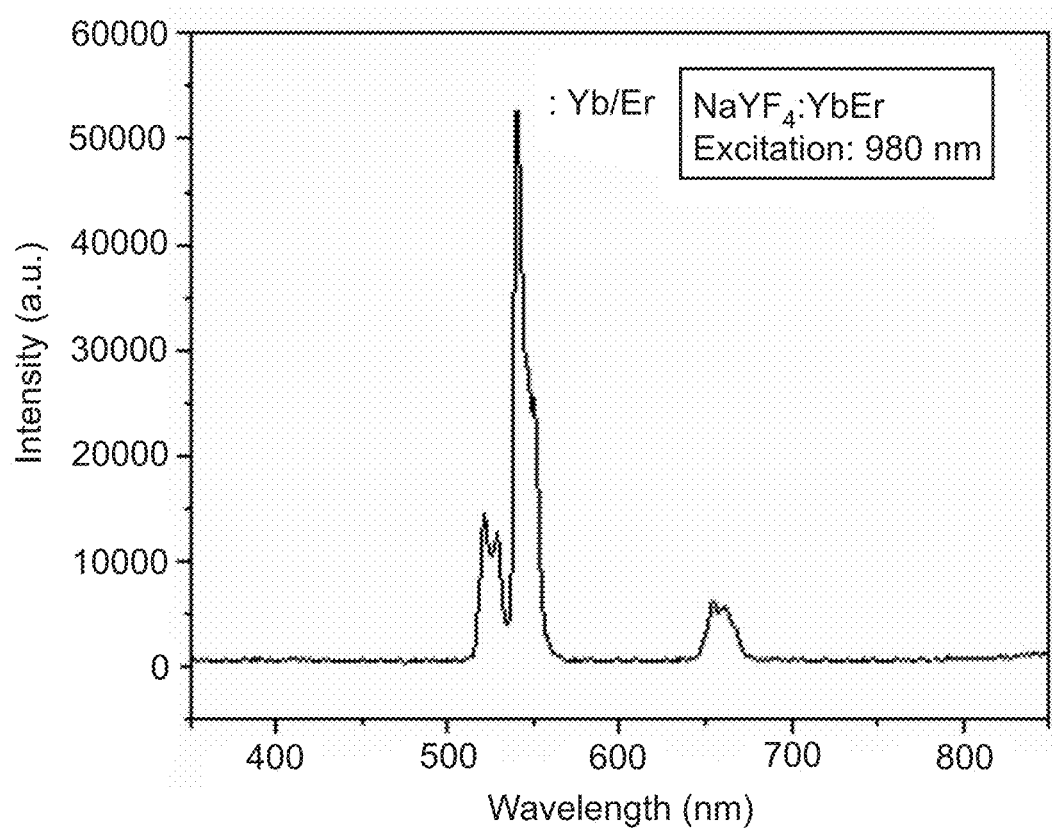
FIG. 4 shows an emission spectrum of a $NaYF_4:Yb/Er$ nanoparticle.

For the synthesis of up-conversion $NaYF_4$:$Yb^{3+}Er^{3+}$ nanoparticles with 20% Yb and 2% Er dopants, yttrium(III) chloride hexahydrate ($YCl_3 \cdot 6H_2O$), ytterbium(III) chloride hexahydrate ($YCl_3 \cdot 6H_2O$) and erbium(III) chloride hexahydrate ($ErCl_3 \cdot 6H_2O$) at stoichiometric ratio were added into mixture of oleic acid, oleylamine and 1-octadecene (1:1:1.5 volume ratio) in a three-neck round-bottom flask. The mixture was heated to 120° C. under an Ar atmosphere and vigorous stirring until a homogeneous solution was formed, and then was cooled to room temperature. A mixture of NaOH and $NH_4F$ in methanol was added dropwise to the solution and stirred for 30 min and then heated to 100° C. to remove methanol under vacuum. Finally, the reaction mixture was heated to 300° C. at a heating rate of 20° C./min and then maintained at this temperature for 6 hours under an Ar atmosphere. Upon completion of the reaction, the formed nanoparticles were purified by washing with ethanol, separated by centrifuge, and then dried at 70° C. FIG. 3 shows an SEM image (JEOL 7100FT Thermal FE SEM, operated at 15 kV) of an example up-converting NaYF$_4$:Yb/Er nanoparticle core. FIG. 4 shows an example emission spectrum of a NaYF$_4$:Yb/Er nanoparticle. The nanoparticle was excited with a 980 nm excitation wavelength, resulting in the emission spectra shown in FIG. 4. The fluorescence or time-resolved fluorescence spectra were measured by a Horiba NanoLog-3 spectrometer with a Xe lamp or a 980-nm laser beam (200 mW) as excitation source, or by an Ocean Optics QEPro portable spectrometer. As can be seen in this example, the up-converting NaYF$_4$:Yb/Er nanoparticle emits light in the visible spectrum.

Example 2: Synthesis of Long-Persistent Nanoparticles

Trivalent chromium doped lithium gallate (LiGa$_5$O$_8$:Cr$^{3+}$) nanoparticles were synthesized by a sol-gel method followed by calcinations at high temperature. A solution was prepared by dissolving stoichiometric amount of lithium nitrate (LiNO$_3$, 99%), gallium nitrate [Ga(NO$_3$)$_3$, 99.999%], and chromium nitrate [Cr(NO$_3$)$_3$, 98.5%] into 1:1 mixed solvent of water-methanol under magnetic stirring. During the stirring process, polyacrylic acid (PAA, MW ~2000) as a chelating agent was added into the solution to form chelate complexes. Then ammonium hydroxide solution (NH$_3$·H$_2$O, 29.5 wt %) was added to form colloidal suspension. When a homogeneous sol was formed, the colloidal particles were separated from the suspension by centrifuge and dried at 100° C. Finally, the dried particles were calcinated in a muffle furnace at ~1100° C. for 6 hours to form LiGa$_5$O$_8$:Cr$^{3+}$ nanoparticles exhibiting NIR persistent luminescence and photo-stimulated persistent luminescence (PSPL) properties.

Figure 5:
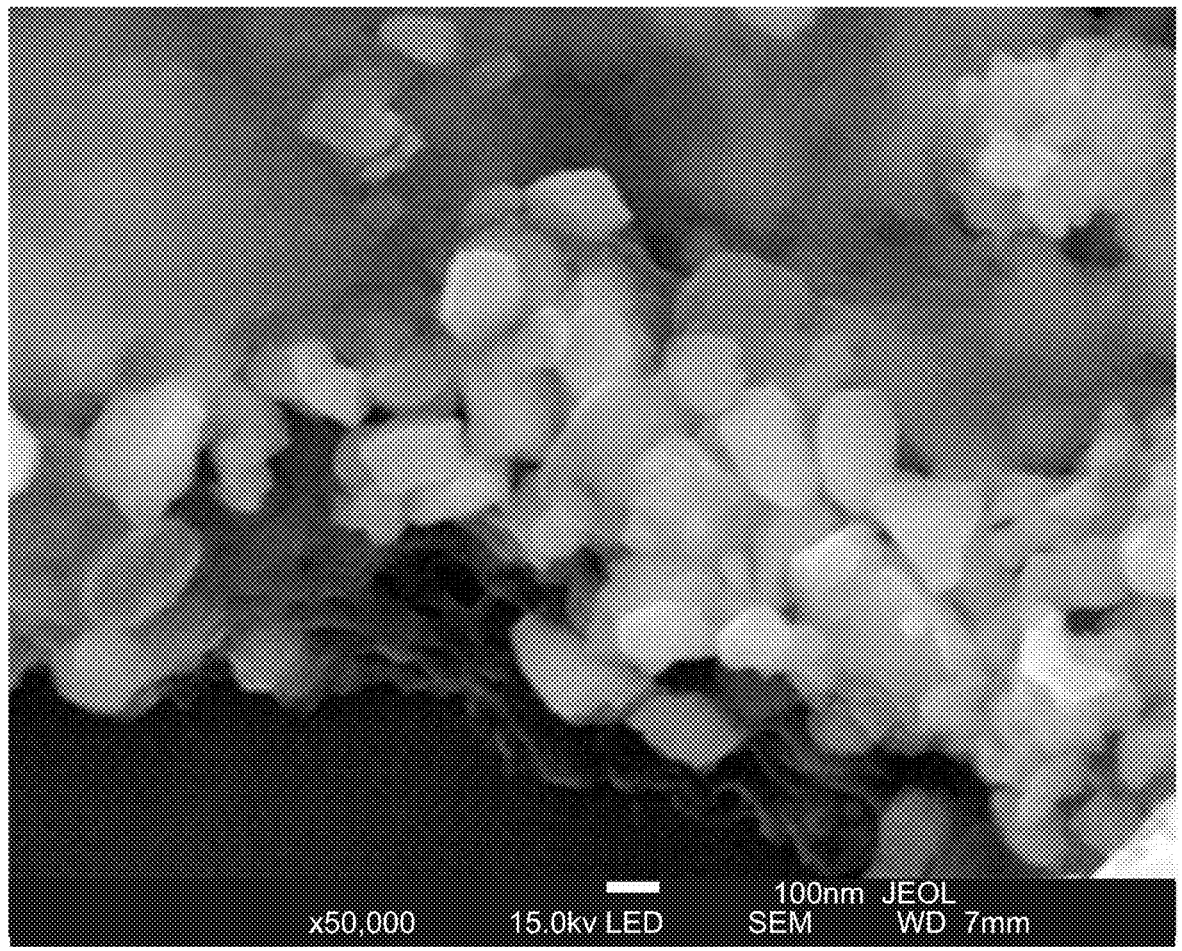
FIG. 5 shows an example SEM image of $Cr^{3+}$-doped lithium gallate nanoparticles.
Figure 6:
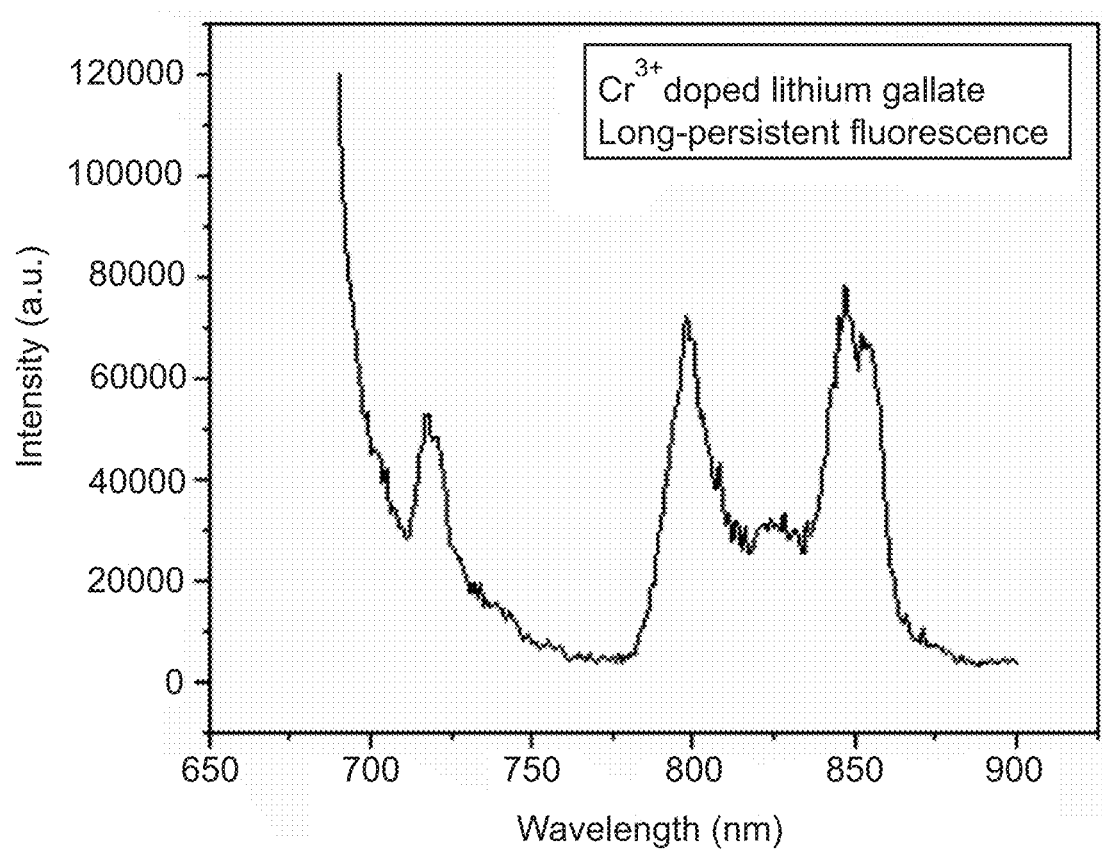
FIG. 6 shows an example of a long-persistent spectrum of $LiGa_5O_8:Cr^{3+}$ that was recorded after excitation by a UV-lamp (at 254 nm) for 5 minutes.

FIG. 5 shows an example SEM image of Cr$^{3+}$-doped lithium gallate nanoparticles. FIG. 6 shows an example of a long-persistent spectrum of LiGa$_5$O$_8$:Cr$^{3+}$ that was recorded after excitation by a UV-lamp (at 254 nm) for 5 minutes.

Figure 7:
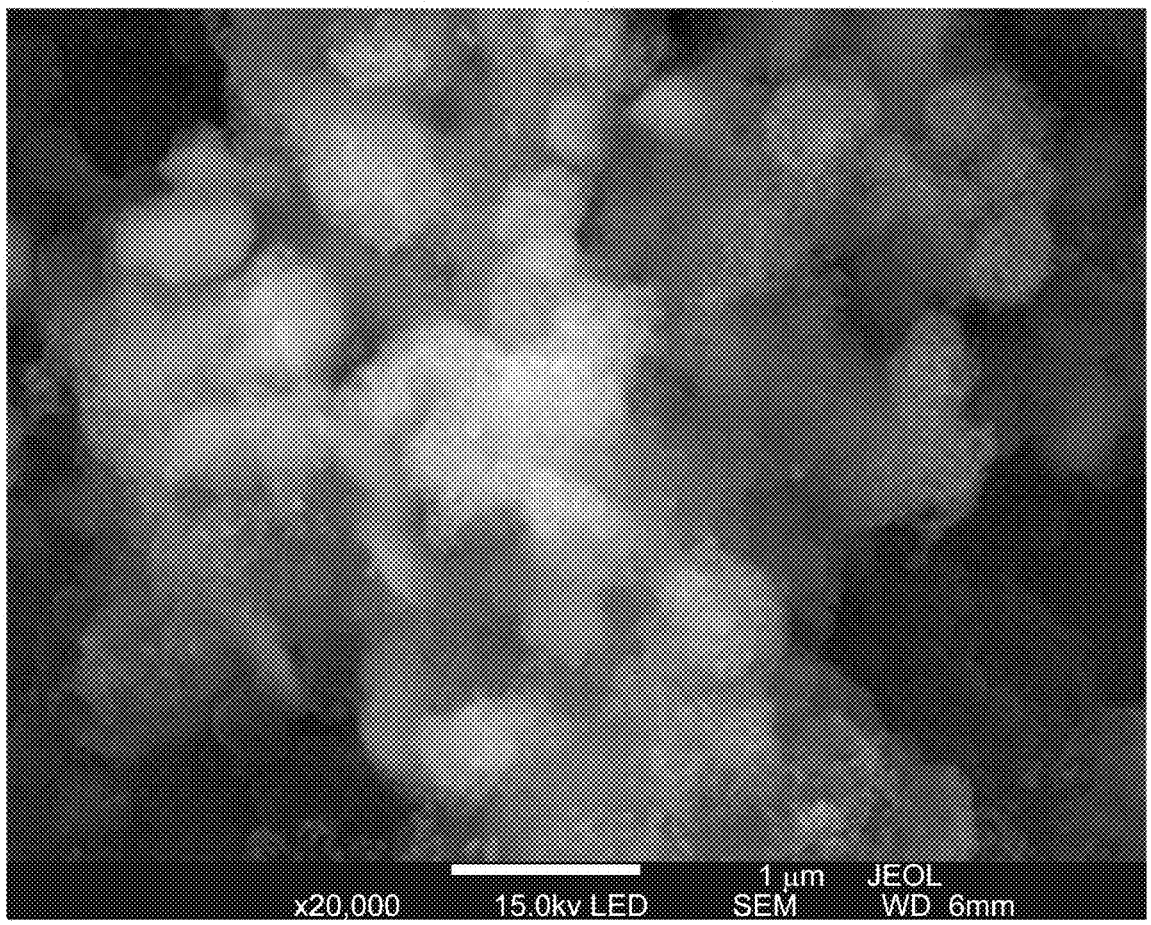
FIG. 7 shows an SEM image of an example of synthesized polystyrene-coated up-converting $NaYF_4:Yb/Er$ nanoparticles.

Example 3: Synthesis of Polymer Coated Composite Nanoparticles 100 mL of NaYF$_4$:Yb/Er nanoparticle suspension at 1-5 wt % in DI water in a round-bottom flask was degassed with N$_2$ for 15 min, and then 2.5 g sodium dodecyl sulfate (SDS) was dissolved. Next, 0.2 g of potassium persulfate (K$_2$S$_2$O$_8$) was added with stirring under an N$_2$ purge. After dissolution of the K$_2$S$_2$O$_8$ initiator, the solution was heated to 90° C. and 1-5 mL of styrenic monomer was injected at 0.02 mL/min by a syringe using a programmable syringe pump. After addition of the monomer, the reaction was allowed to proceed for 30 min and the reaction was then cooled to room temperature. FIG. 7 shows an example of an SEM image of synthesized polystyrene-coated up-converting NaYF$_4$:Yb/Er nanoparticles.

Figure 8:
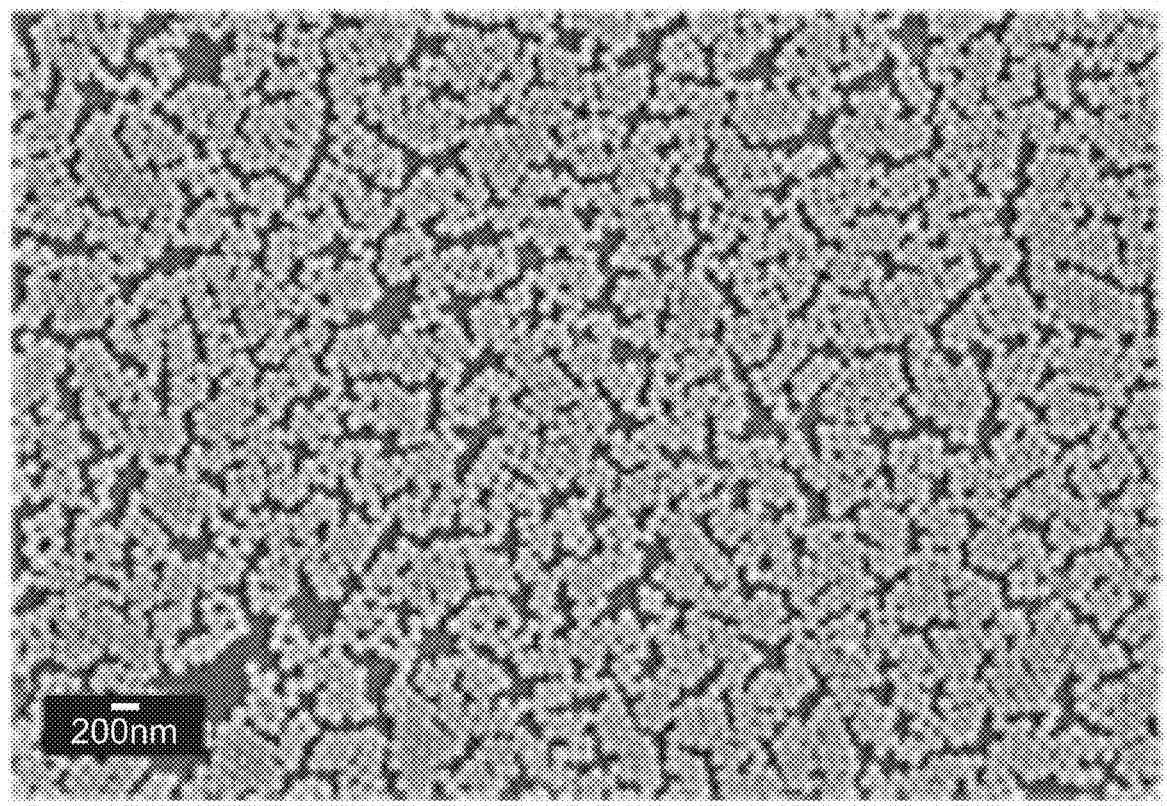
FIG. 8 shows an example SEM image of a Eu(TTA)$_3$phenanthroline complex coated with polystyrene.

Example 4: Encapsulated Luminescent Lanthanide (Eu) Complexes in Polymer Nanoparticles FIG. 8 shows an example SEM image of a Eu(TTA)$_3$phenanthroline complex coated with polystyrene. The sample was imaged by a field-emission SEM (JEOL JSM-7100F SEM) with an accelerating voltage of 15 kV to collect the images. The nanoparticle solution is drop-cast on a silicon wafer substrate then dried in vacuum overnight for SEM imaging.

The nanoparticles were synthesized with an emulsion polymerization protocol. The emulsion polymerization was conducted using 3 wt % of 50 ml Sodium Dodecyl Sulfate or IGEPAL CA-897 in a three-neck round-bottom flask in an oil bath on a hotplate. The round-bottom flask was equipped with inlet for nitrogen gas and inlet of tubing to inject the monomer, for example styrene monomers. The solution was stirred and degassed for about 30 minutes under nitrogen flow, and then 1 ml of 5 mg/ml Eu(TTA)$_3$phenanthroline complex in acetone was added to the solution. Next, 25 mg of ammonium persulfate (APS) or V-50 and 100 µg of 1 M NaOH solution were added. A syringe containing 3 ml of uninhibited styrene monomer was prepared by mixing styrene monomer with 10% of divinylbenzene as a crosslinker. The flask was heated to 80° C. for 10 min. About 1 ml of styrene monomer was injected dropwise into the solution at a rate of 0.02 ml/min. Heating and magnetic stirring was maintained under nitrogen for about 2 hours. An additional coating can be processed by adding 10 mg of APS or V-50 followed by 1 ml of styrene monomer at 0.2 ml/min at 80° C. Heating and magnetic stirring are maintained under nitrogen for about 2 hours.

Figure 9:
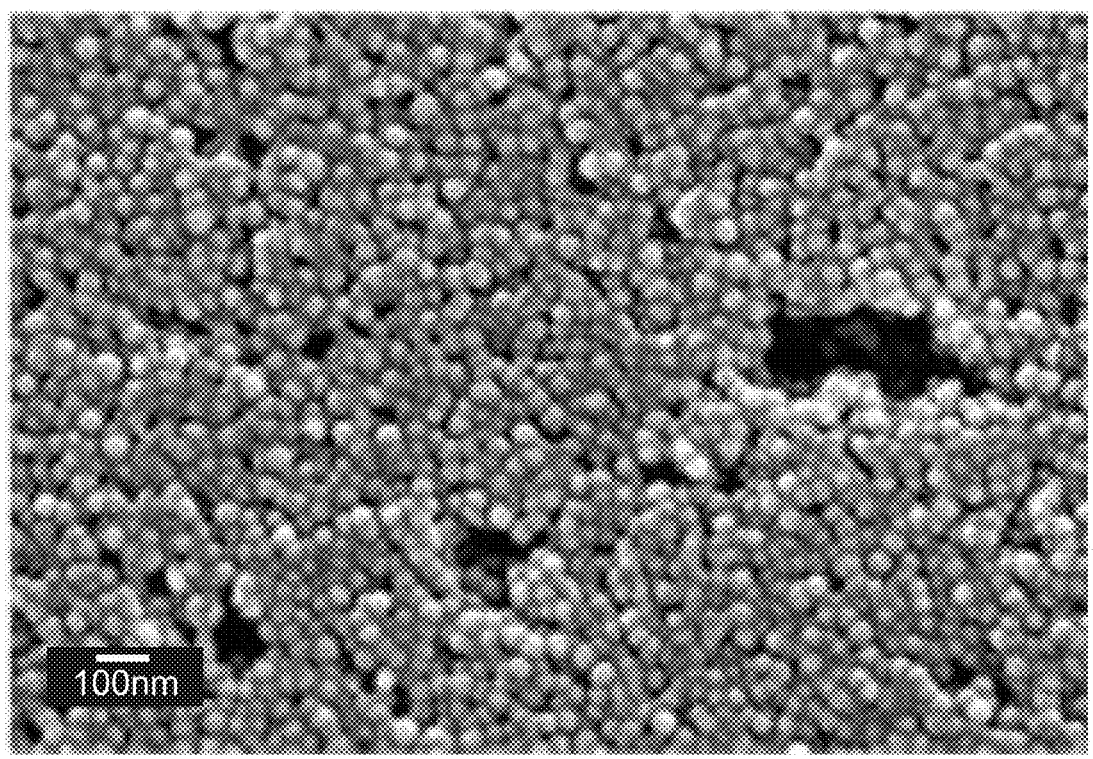
FIG. 9 shows an example SEM image of a Dy(TTA)$_3$phenanthroline complex.

Example 5: Encapsulated Luminescent Lanthanide (Dy) Complexes in Polymer Nanoparticles FIG. 9 shows an example SEM image of a Dy(TTA)$_3$phenanthroline complex. The nanoparticles were synthesized with an emulsion polymerization protocol. The emulsion polymerization was been conducted using 3 wt % of 50 ml Sodium Dodecyl Sulfate or IGEPAL CA-897 in a three-neck round-bottom flask in an oil bath on a hotplate. The round bottom flask was equipped with an inlet for nitrogen gas and inlet of tubing to inject the monomer, for example styrene. The solution was stirred and degassed for about 30 minutes under nitrogen flow then 1 ml of 5 mg/ml Dy(TTA)$_3$phenanthroline complex in acetone was added to the solution. Next, 25 mg of ammonium persulfate (APS) or V-50 and 100 µg of 1 M NaOH was added to the solution. A syringe containing 3 ml of uninhibited styrene monomer prepared by mixing styrene monomer with 10% of divinylbenzene as crosslinker. The flask was then heated to 80° C. for 10 min. About 1 ml of styrene monomer was dripped into the solution at a rate of 0.02 ml/min. Heating and magnetic stirring were maintained under nitrogen for about 2 hours. An additional coating can be processed by adding 10 mg of APS or V-50, followed by 1 ml of styrene monomer at a rate of 0.2 ml/min at 80° C. Heating and magnetic stirring were maintained under nitrogen for about 2 hours.

Example 6: Encapsulated Luminescent SLE Eu Nanoparticles

Figure 10:
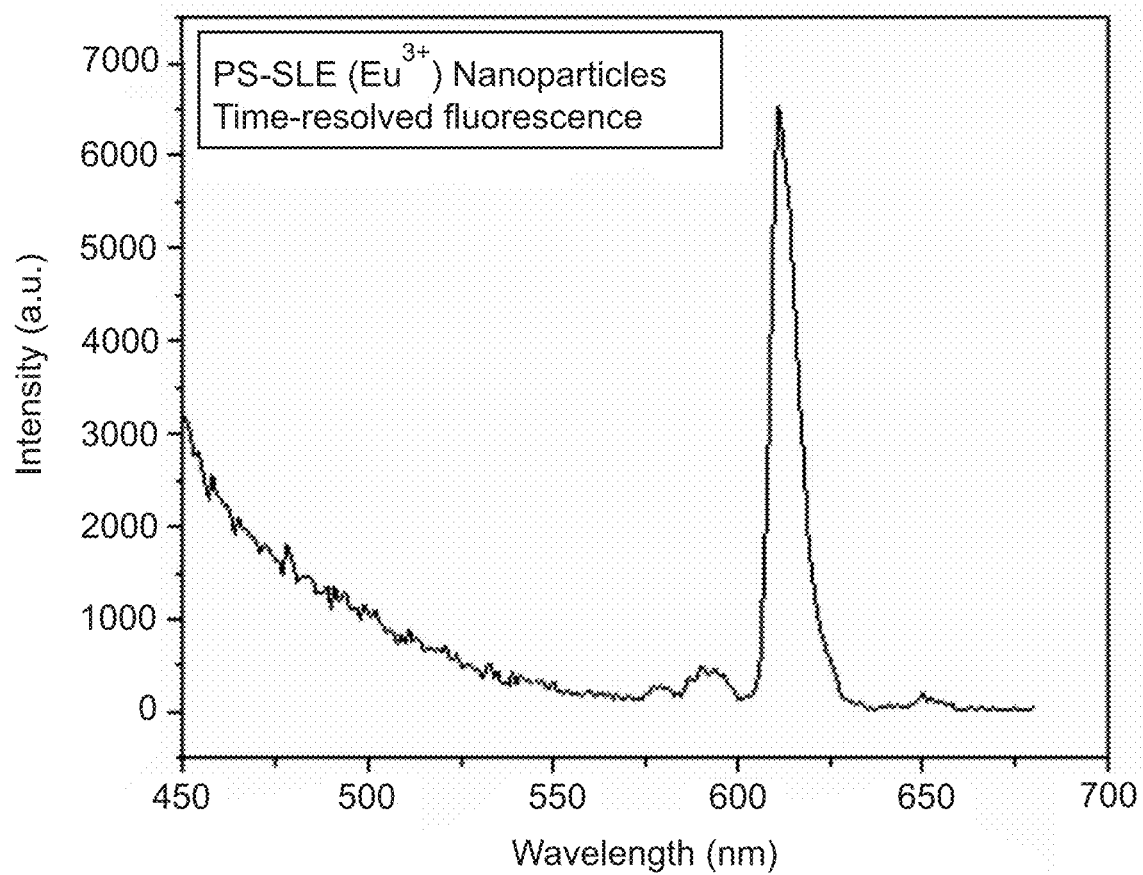
FIG. 10 shows an example of a time-resolved fluorescence spectrum of a polystyrene-coated SLE nanoparticle.

FIG. 10 shows an example of a time-resolved fluorescence spectrum of a polystyrene-coated sheathed lanthanide emitter (SLE) Eu(TTA)$_3$phen complex nanoparticle. Fluorescence was recorded with a 50 µs delay after excitation at 360 nm using a Horiba Nanolog system. The samples were transferred in a quartz cuvette for fluorescence measurements.

Example 7: Detection by Fluorescence Imaging—Up-Converting Nanoparticles

Figure 11:
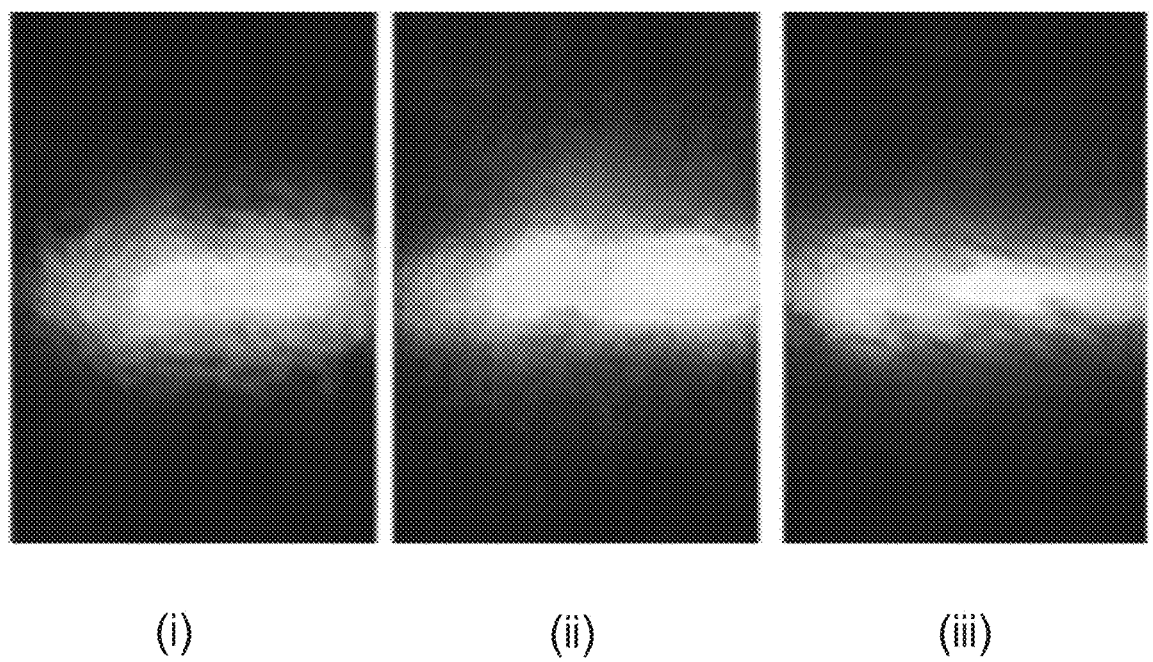
FIG. 11 shows an example of the visible fluorescence of up-converting nanoparticles which exhibit blue color by $NaYF_4:Yb/Tm$ (i), green color by $NaYF_4:Yb/Er$ (ii), and orange color by $NaYF_4:Yb/Ho$ (iii).

Because of the unique fluorescence properties of up-converting nanoparticles and long-persistence nanoparticles, both types of particles can be detected by direct imaging using a camera or time-gated camera. FIG. 11 shows an example of the visible fluorescence of up-converting nanoparticles with different compositions under 980 nm excitation by a near infrared laser, which exhibits blue color by NaYF$_4$:Yb/Tm (i), green color by NaYF$_4$:Yb/Er (ii) and orange color by NaYF$_4$:Yb/Ho (iii).

Example 8: Detection by Fluorescence Imaging—Long-Persistent Nanoparticles

Figure 12:
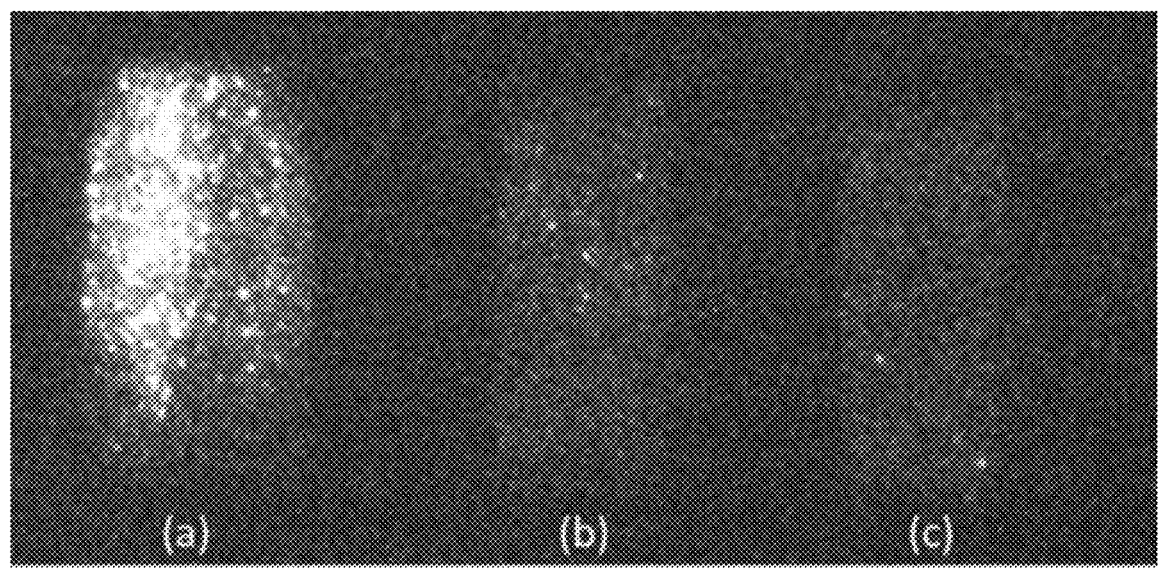
FIG. 12 shows an example time-gate fluorescence image of a long-persistent nanoparticle in bentonite mud.

The fluorescence of long-persistent nanoparticles in drilling mud was analyzed with a time-gated camera. A drop of a bentonite mud sample that includes a long-persistent nanoparticle tag was smeared and dried on to the surface of a black tape. FIG. 12 shows an example time-gated fluorescence image of a long-persistent nanoparticle, SrAl$_2$O$_4$:Eu$^{2+}$/Dy$^{3+}$, in bentonite mud at concentrations of (a) 0.1 wt %, (b) 0.01 wt %, and (c) 0.001 wt %. Even though the samples include many interfering compounds that can fluoresce in the UV-visible range under the same excitation, the long-persistent luminescence of these tags allows for the interfering fluorescence signals to be eliminated or reduced by time-resolved gating of the detector.

Example 9: Detection by Fluorescence Spectroscopy

Figure 13:
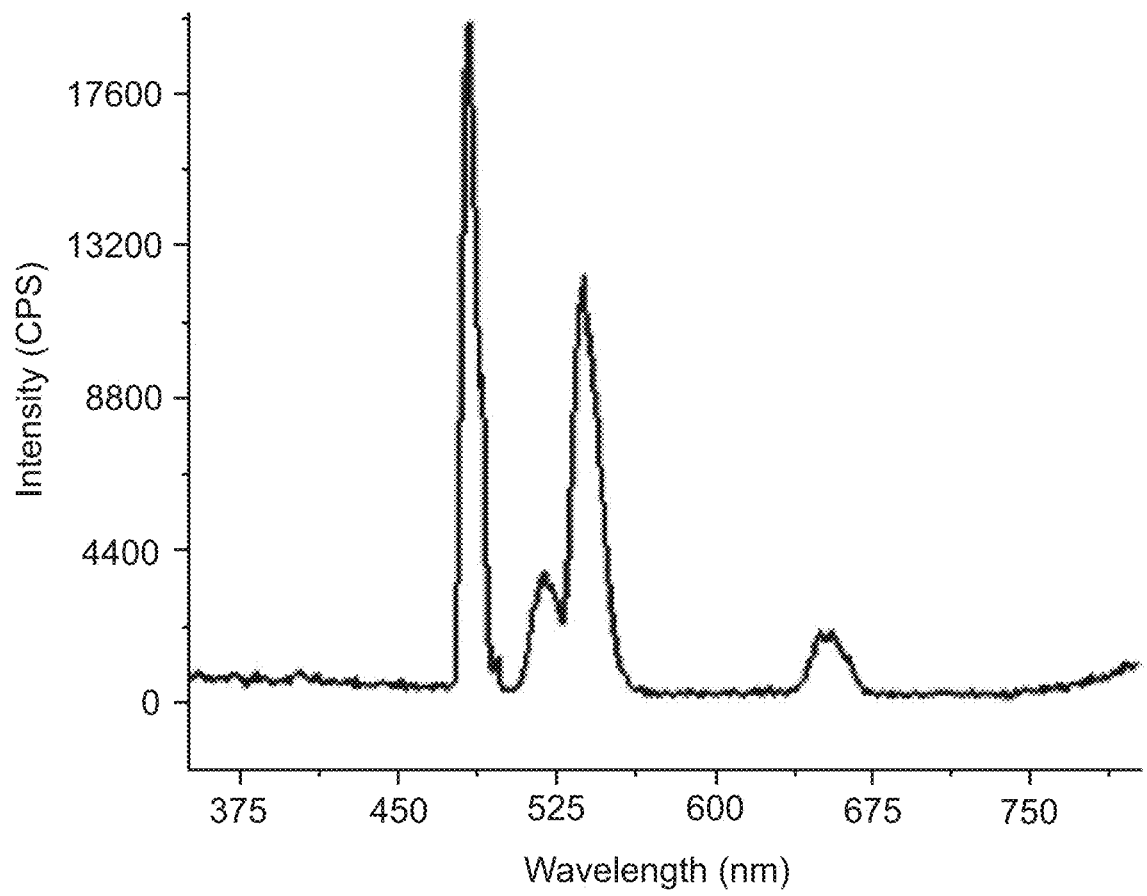
FIG. 13 shows an example spectrum of $NaYF_4:Yb/Er$ powder with bentonite powder.

The fluorescence of up-converting nanoparticles and long-persistent nanoparticles can be detected by a fluorescence spectrometer, for example as a portable spectrometer. A suitable spectrometer is available from Ocean Optics. The tags described herein with different compositions have different spectra under different excitations. FIG. 13 shows an example spectrum of NaYF$_4$:Yb/Er powder with 0.0001 wt % bentonite powder, under excitation of a 980 nm laser at 200 mW. Bentonite is commonly used in mud fluids and therefore these conditions simulate the real world drilling conditions.

In some implementations, a nanoparticle tag includes a fluorescent core and a polymer shell. The fluorescent core includes an up-converting material. The polymer shell includes styrene-based monomers or methacrylate-based monomers, or any combination thereof.

This aspect, taken alone or combinable with any other aspect, can include the following features. The styrene-based monomers include monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

This aspect, taken alone or combinable with any other aspect, can include the following features. The methacrylate-based monomers include monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

This aspect, taken alone or combinable with any other aspect, can include the following features. The fluorescent core includes a rare-earth element doped oxide.

This aspect, taken alone or combinable with any other aspect, can include the following features. The fluorescence core consists essentially of NaYF$_4$:Yb/Er, NaYF$_4$:Yb/Ho, NaYF$_4$:Yb/Tm, NaGdF$_4$:Yb/Er, NaGdF$_4$:Yb/Ho, NaGdF$_4$:Yb/Tm, YPO$_4$:Yb/Er, YPO$_4$:Yb/Ho, YPO$_4$:Yb/Tm, CaTiO$_3$:Yb/Er, CaTiO$_3$:Yb/Ho, or CaTiO$_3$:Yb/Tm, or any combinations thereof.

This aspect, taken alone or combinable with any other aspect, can include the following features. The polymer shell is a thermally depolymerizable or degradable shell.

This aspect, taken alone or combinable with any other aspect, can include the following features. The polymer shells includes monomer fingerprint information.

This aspect, taken alone or combinable with any other aspect, can include the following features. The nanoparticle is less than 1000 nm in diameter.

In some implementations, a nanoparticle tag includes a fluorescent core and a polymer shell. The fluorescent core includes a long-persistent fluorescent material. The long-persistent fluorescent material consists essentially of CaTiO$_3$:Pr$^{3+}$, CaAl$_2$O$_4$:Eu$^{2+}$/Nd$^{3+}$, Ca$_3$(PO$_4$)$_2$:Sm$^{3+}$/Mn$^{2+}$, SrAl$_2$O$_4$:Eu$^{2+}$/Dy$^{3+}$, SrMgSi$_2$O$_7$:Eu/Dy, Sr$_4$Al$_{14}$O$_{25}$:Eu/Dy, ZnGa$_2$O$_4$:Cr$^{3+}$, LiGa$_5$O$_8$:Cr$^{3+}$, Zn$_3$Ga$_2$Ge$_2$O$_{10}$:Cr$^{3+}$/Pr$^{3+}$, or Zn$_3$Ga$_2$Ge$_2$O$_{10}$:Cr$^{3+}$/Eu$^{3+}$, or any combinations thereof. The polymer shell includes styrene-based monomers or methacrylate based monomers, or any combinations thereof.

This aspect, taken alone or combinable with any other aspect, can include the following features. The styrene-based monomers include monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

This aspect, taken alone or combinable with any other aspect, can include the following features. The methacrylate-based monomers include monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

This aspect, taken alone or combinable with any other aspect, can include the following features. The polymer shell is a thermally depolymerizable or degradable shell.

This aspect, taken alone or combinable with any other aspect, can include the following features. The polymer shells includes monomer fingerprint information.

This aspect, taken alone or combinable with any other aspect, can include the following features. The nanoparticle is less than 1000 nm in diameter.

In some implementations, a nanoparticle tag includes a fluorescent core and a polymer shell. The fluorescent core includes an encapsulated lanthanide complex where the encapsulated lanthanide complex includes a lanthanide ion where all metal binding sites of the lanthanide ion are occupied by ligands. The polymer shell includes styrene-based monomers or methacrylate-based monomers, or any combination thereof.

This aspect, taken alone or combinable with any other aspect, can include the following features. The styrene-based monomers include monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

This aspect, taken alone or combinable with any other aspect, can include the following features. The methacrylate-based monomers include monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

This aspect, taken alone or combinable with any other aspect, can include the following features. The encapsulated lanthanide complex includes a lanthanide ion complexed with LX-type ligands.

This aspect, taken alone or combinable with any other aspect, can include the following features. The LX-type ligands include β-diketonates.

This aspect, taken alone or combinable with any other aspect, can include the following features. The β-diketonates comprise 1,1,1-trifluoro-3-(2-theonyl)acetone, or benzyl trifluoroacetone, or any combination thereof.

This aspect, taken alone or combinable with any other aspect, can include the following features. The encapsulated lanthanide complex includes a lanthanide ion complexed with dative type ligands.

This aspect, taken alone or combinable with any other aspect, can include the following features. The dative type ligands include trioctylphosphine oxide, bipyridine, or phenanthroline, or any combination thereof.

This aspect, taken alone or combinable with any other aspect, can include the following features. The polymer shell is a thermally depolymerizable or degradable shell.

This aspect, taken alone or combinable with any other aspect, can include the following features. The polymer shells comprises monomer fingerprint information.

This aspect, taken alone or combinable with any other aspect, can include the following features. The nanoparticle is less than 1000 nm in diameter.

In some implementations, a method of determining the origin location of a subterranean rock sample includes mixing a nanoparticle tag into a fluid, flowing the fluid through a work string into a subterranean formation, recovering subterranean rock samples from the subterranean formation, and determining an origin location of the subterranean rock sample by detecting the presence of the nanoparticle tag on the subterranean rock sample.

This aspect, taken alone or combinable with any other aspect, can include the following features. The fluid includes a drilling mud.

This aspect, taken alone or combinable with any other aspect, can include the following features. The nanoparticle tag includes a fluorescent core and a polymer shell.

This aspect, taken alone or combinable with any other aspect, can include the following features. Detecting the presence of the nanoparticle tag on the rock sample includes analyzing the subterranean rock sample for a fluorescence signal, and analyzing the subterranean rock samples with a fluorescence signal to determine the identity of the polymer shell.

This aspect, taken alone or combinable with any other aspect, can include the following features. Analyzing the subterranean rock sample for a fluorescence signal includes analyzing the subterranean rock sample for an up-conversion signal.

This aspect, taken alone or combinable with any other aspect, can include the following features. Analyzing the subterranean rock sample for an up-conversion signal includes exciting the subterranean rock sample with an ultraviolet light source, and observing a resulting visible or ultraviolet fluorescence signal.

This aspect, taken alone or combinable with any other aspect, can include the following features. Analyzing the subterranean rock sample for a fluorescence signal includes analyzing the subterranean rock sample with a time-gated fluorescence measurement.

This aspect, taken alone or combinable with any other aspect, can include the following features. Determining the identity of the polymer shell includes analyzing the polymer shell with mass spectroscopy.

This aspect, taken alone or combinable with any other aspect, can include the following features. Analyzing the polymer shell with mass spectroscopy includes analyzing the polymer shell with pyrolysis-gas chromatography-mass spectrometry.

This aspect, taken alone or combinable with any other aspect, can include the following features. Analyzing the polymer shell with mass spectroscopy comprises analyzing the polymer shell with gas chromatography—flame ionization detection/mass spectrometry.

In some implementations, a method of characterizing the origin depth of a cut rock sample includes using a barcoded tracer to determine the origin location based on the travel time of the produced rock cuttings from a drill head to the surface via an annulus. The barcoded tracer includes a nanoparticle tag with a fluorescent core and a polymer shell. The method includes using fluorescence detection to detect the presence of the nanoparticle tags on the cut rock sample and analyzing the polymer shell to yield fingerprint monomer information of the nanoparticle tags on the cut rock sample.

The following units of measure have been mentioned in this disclosure:

| Unit of Measure | Full form |
| --- | --- |
| nm | nanometer |
| μm | micrometer |
| μs | microsecond |
| wt % | weight percent |
| mW | milliwatt |

The term "about" as used in this disclosure can allow for a degree of variability in a value or range, for example, within 10%, within 5%, or within 1% of a stated value or of a stated limit of a range.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some implementations, a flow pathway can be a water source and can include water. In some implementations, a flow pathway can be a petroleum source and can include petroleum. In some implementations, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

What is claimed is:

1. A nanoparticle tag, comprising:
   a fluorescent core, wherein the fluorescent core comprises an up-converting material; and
   a polymer shell, wherein the polymer shell comprises styrene-based monomers or methacrylate-based monomers, or any combination thereof, and wherein the polymer shell comprises monomer fingerprint information.

2. The nanoparticle tag of claim 1, wherein the styrene-base monomers comprise monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

3. The nanoparticle tag of claim 1, wherein the methacrylate-based monomers comprise monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

4. The nanoparticle tag of claim 1, wherein the fluorescent core comprises a rare-earth element doped oxide.

5. The nanoparticle tag of claim 1, wherein the fluorescence core consists essentially of $NaYF_4:Yb/Er$, $NaYF_4:Yb/Ho$, $NaYF_4:Yb/Tm$, $NaGdF_4:Yb/Er$, $NaGdF_4:Yb/Ho$, $NaGdF_4:Yb/Tm$, $YPO_4:Yb/Er$, $YPO_4:Yb/Ho$, $YPO_4:Yb/Tm$, $CaTiO_3:Yb/Er$, $CaTiO_3:Yb/Ho$, or $CaTiO_3:Yb/Tm$, or any combinations thereof.

6. The nanoparticle tag of claim 1, wherein the polymer shell is a thermally depolymerizable or degradable shell.

7. The nanoparticle tag of claim 1, wherein the nanoparticle is less than 1000 nm in diameter.

8. A nanoparticle tag, comprising:
   a fluorescent core, wherein the fluorescent core comprises a long-persistent fluorescent material, wherein the long-persistent fluorescent material consists essentially of $CaTiO_3:Pr^{3+}$, $CaAl_2O_4:Eu^{2+}/Nd^{3+}$, $Ca_3(PO_4)_2:Sm^{3+}/Mn^{2+}$, $SrAl_2O_4:Eu^{2+}/Dy^{3+}$, $SrMgSi_2O_7:Eu/Dy$, $Sr_4Al_{14}O_{25}:Eu/Dy$, $ZnGa_2O_4:Cr^{3+}$, $LiGa_5O_8:Cr^{3+}$, $Zn_3Ga_2Ge_2O_{10}:Cr^{3+}/Pr^{3+}$, or $Zn_3Ga_2Ge_2O_{10}:Cr^{3+}/Eu^{3+}$, or any combinations thereof; and
   a polymer shell, wherein the polymer shell comprises styrene-based monomers or methacrylate-based monomers, or any combination thereof, and wherein the polymer shell comprises monomer fingerprint information.

9. The nanoparticle tag of claim 8, wherein the styrene-base monomers comprise monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

10. The nanoparticle tag of claim 8, wherein the methacrylate-based monomers comprise monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

11. The nanoparticle tag of claim 8, wherein the polymer shell is a thermally depolymerizable or degradable shell.

12. The nanoparticle tag of claim 8, wherein the nanoparticle is less than 1000 nm in diameter.

13. A nanoparticle tag, comprising:
   a fluorescent core, wherein the fluorescent core comprises an encapsulated lanthanide complex comprising a lanthanide ion wherein all metal binding sites of the lanthanide ion are occupied by ligands; and a polymer shell, wherein the polymer shell comprises styrene-based monomers or methacrylate-based monomers, or any combination thereof, and wherein the polymer shell comprises monomer fingerprint information.

14. The nanoparticle tag of claim 13, wherein the styrene-base monomers comprise monomers derived from styrene, p-methylstyrene, p-methoxystyrene, 2,4-dimethylstyrene, 2,4,6-trimethylstyrene, 4-chlorostyrene, or 4-bromostyrene, or any combination thereof.

15. The nanoparticle tag of claim 13, wherein the methacrylate-based monomers comprise monomers derived from acrylate, benzyl methacrylate, butyl methacrylate, cyclohexyl methacrylate, dodecyl methacrylate, 2-ethoxyethyl methacrylate, ethyl methacrylate, hexyl methacrylate, 2-hydroxyethyl methacrylate, isobutyl methacrylate, isopropyl methacrylate, methyl methacrylate, octadecyl methacrylate, octyl methacrylate, phenyl methacrylate, propyl methacrylate, or 2-chloroethyl methacrylate, or any combination thereof.

16. The nanoparticle tag of claim 13, wherein the encapsulated lanthanide complex comprises a lanthanide ion complexed with LX-type ligands.

17. The nanoparticle tag of claim 16, wherein the LX-type ligands comprise β-diketonates.

18. The nanoparticle tag of claim 17, wherein the β-diketonates comprise 1,1,1-trifluoro-3-(2-theonyl)acetone, or benzyl trifluoroacetone, or any combination thereof.

19. The nanoparticle tag of claim 13, wherein the encapsulated lanthanide complex comprises a lanthanide ion complexed with dative type ligands.

20. The nanoparticle tag of claim 19, wherein the dative type ligands comprise trioctylphosphine oxide, bipyridine, or phenanthroline, or any combination thereof.

21. The nanoparticle tag of claim 13, wherein the polymer shell is a thermally depolymerizable or degradable shell.

22. The nanoparticle tag of claim 13, wherein the nanoparticle is less than 1000 nm in diameter.

23. A method of determining the origin location of a subterranean rock sample, comprising:

mixing a nanoparticle tag into a fluid, wherein the nanoparticle tag comprises
   a fluorescent core, wherein the fluorescent core comprises an up-converting material, and
   a polymer shell, wherein the polymer shell comprises styrene-based monomers or methacrylate-based monomers, or any combination thereof, and wherein the polymer shell comprises monomer fingerprint information;

flowing the fluid through a work string into a subterranean formation;

recovering subterranean rock samples from the subterranean formation; and determining an origin location of the subterranean rock sample by detecting the presence of the nanoparticle tag on the subterranean rock sample.

24. The method of claim 23, wherein the fluid comprises a drilling mud.

25. The method of claim 23, wherein detecting the presence of the nanoparticle tag on the subterranean rock sample comprises:

analyzing the subterranean rock sample for a fluorescence signal; and analyzing the subterranean rock samples with a fluorescence signal to determine the identity of the polymer shell.

26. The method of claim 25, wherein analyzing the subterranean rock sample for a fluorescence signal comprises analyzing the subterranean rock sample for an up-conversion signal.

27. The method of claim 26, wherein analyzing the subterranean rock sample for an up-conversion signal comprises:

exciting the subterranean rock sample with an ultraviolet light source; and observing a resulting visible or ultraviolet fluorescence signal.

28. The method of claim 23, wherein determining the identity of the polymer shell comprises analyzing the polymer shell with mass spectroscopy.

29. The method of claim 28, wherein analyzing the polymer shell with mass spectroscopy comprises analyzing the polymer shell with pyrolysis-gas chromatography-mass spectrometry.

30. The method of claim 28, wherein analyzing the polymer shell with mass spectroscopy comprises analyzing the polymer shell with gas chromatography-flame ionization detection/mass spectrometry.

31. A method of characterizing the origin depth of a cut rock sample, comprising:

using a barcoded tracer to determine the origin location based on the travel time of the produced rock cuttings from a drill head to the surface via an annulus, wherein the barcoded tracer comprises a nanoparticle tag with a fluorescent core and a polymer shell, wherein the fluorescent core comprises an up-converting material and wherein the polymer shell comprises styrene-based monomers or methacrylate-based monomers, or any combination thereof, and wherein the polymer shell comprises monomer fingerprint information;

using fluorescence detection to detect the presence of the nanoparticle tags on the cut rock sample; and analyzing the polymer shell to yield fingerprint monomer information of the nanoparticle tags on the cut rock sample.

* * * * *

UNITED STATES PATENT AND TRADEMARK OFFICE
CERTIFICATE OF CORRECTION

PATENT NO. : 12,110,448 B2
APPLICATION NO. : 17/522437
DATED : October 8, 2024
INVENTOR(S) : Wei Wang, Hooisweng Ow and Sehoon Chang Page 1 of 1

It is certified that error appears in the above-identified patent and that said Letters Patent is hereby corrected as shown below:

In the Claims

Column 16, Lines 4-5, Claim 2, please replace "styrene-base" with -- styrene-based --.

Column 16, Lines 45-46, Claim 9, please replace "styrene-base" with -- styrene-based --.

Column 17, Lines 7-8, Claim 14, please replace "styrene-base" with -- styrene-based --.

Signed and Sealed this
Twenty-sixth Day of November, 2024

Katherine Kelly Vidal
*Director of the United States Patent and Trademark Office*